United States Patent [19]
Goda

[11] Patent Number: 5,555,623
[45] Date of Patent: Sep. 17, 1996

[54] METHOD FORMAKING AND PRODUCING OBJECT LENS HOLDER

[75] Inventor: Yoshimasa Goda, Kanagawa, Japan

[73] Assignee: Sony Corporation, Tokyo, Japan

[21] Appl. No.: 237,472

[22] Filed: May 3, 1994

Related U.S. Application Data

[62] Division of Ser. No. 871,661, Apr. 21, 1993, Pat. No. 5,381,273.

[30] Foreign Application Priority Data

Apr. 21, 1991 [JP] Japan ..................................... 3-123030

[51] Int. Cl.⁶ .............................. B23P 15/00; B28B 5/00; G11B 7/00
[52] U.S. Cl. ..................... 29/896.9; 264/251; 369/44.16
[58] Field of Search .......................... 29/173, 469, 527.1, 29/896.9, 896.93; 264/250, 251, 252; 267/160; 359/813, 814; 369/44.14, 44.15, 44.16

[56] References Cited

U.S. PATENT DOCUMENTS

| | | | |
|---|---|---|---|
| 4,408,830 | 10/1983 | Wutherich | 350/247 |
| 4,764,958 | 8/1988 | Grant | 379/450 |
| 5,018,836 | 5/1991 | Noda et al. | 350/247 |
| 5,040,873 | 8/1991 | Takamatsu et al. | 359/808 |
| 5,050,963 | 9/1991 | Murakami | 359/808 |
| 5,103,438 | 4/1992 | Masunaga et al. | 364/44.22 |
| 5,136,558 | 8/1992 | Getreuer et al. | 369/44.19 |
| 5,170,089 | 12/1992 | Fulton | 310/328 |
| 5,184,002 | 2/1993 | Chu | 235/454 |
| 5,313,332 | 5/1994 | Schell et al. | 359/813 |

FOREIGN PATENT DOCUMENTS

| | | | |
|---|---|---|---|
| 0394032A3 | 10/1990 | European Pat. Off. | G11B 7/09 |
| 890024406 | 8/1990 | Japan | G11B 7/09 |
| WO84/04991 | 12/1984 | WIPO | 359/819 |

*Primary Examiner*—P. W. Echols
*Attorney, Agent, or Firm*—Limbach & Limbach L.L.P.

[57] ABSTRACT

An object lens holder for holding an object lens for converging a laser light radiated from a laser light source on a signal recording surface of an optical recording medium includes a bobbin part formed by abutting and connecting first and second bobbin halves which are counterparts to each other, a holder part formed by abutting and connecting first and second holder halves which are counterparts to each other, which holder part is used as a mounting supporting part to a supporting base plate, first and second resilient deflecting members arranged in parallel to each other for interconnecting the first bobbin half and the first holder half, and third and fourth resilient deflecting members arranged in parallel to each other and to the first and second resilient deflecting members for interconnecting the second bobbin half and the second holder half. This object lens holder may be assembled continuously and in larger quantities, and is a component of an object lens driving device for accurately driving and displacing the object lens in a direction along its optical axis and in a direction normal to this optical axis.

6 Claims, 30 Drawing Sheets

METHOD FORMAKING AND PRODUCING OBJECT LENS HOLDER

This is a divisional of application Ser. No. 07/871,661, filed Apr. 21, 1992 now U.S. Pat. No. 5,381,273.

BACKGROUND OF THE INVENTION

1. Field of the Invention

This invention relates to an object lens holder employed in an object lens driving controlling device adapted for converging a laser light, radiated from a light source, such as a semiconductor laser, on a signal recording surface of an optical disc, or causing the laser light to follow a recording track(s) on the optical disc. The invention also relates to a method for producing the object lens holder and an object lens holder block comprised of an interconnection of a large number of such object lens holders.

2. Description of the Prior Art

Heretofore, an optical disc player or an optical recording/reproducing apparatus, employing an optical disc as a recording medium, is provided with an optical pickup device for irradiating the signal recording surface of the optical disc with a laser light and detecting the reflected return light from the signal recording surface for recording and/or reading or reproducing information signals on or from the signal recording surface.

The optical pickup device is comprised of a light source, such as a semiconductor laser, radiating the laser light to the signal recording surface of the optical disc, an object lens for converging the laser light radiated from the laser light source to the signal recording surface of the optical disc and a photodetector for detecting the reflected return light from the signal recording surface of the optical disc.

The optical pickup device is provided with an object lens driving device for accurately reading information signals recorded with a high recording density on the optical disc or accurately recording information signals on the recording track(s) of the optical disc. The object lens driving device controls the laser light for accurately converging the laser light radiated from the laser light source on the signal recording surface of the optical disc and causing the laser light to follow the recording track(s) on the optical disc. That is, the object lens driving device actuates the object lens, adapted for radiating the laser light to the signal recording surface of the optical disc, so that the object lens is displaced in a focusing direction or along the optical axis and in a tracking direction normal to the focusing direction, on the basis of focusing controlling signals and tracking controlling signals, so that the laser light is accurately converged on the signal recording surface of the optical disc at the same time that it is caused to correctly follow the recording track(s) of the optical disc.

FIG.1 shows an example of this type of the object lens driving device, which is of an axial sliding and rotating type device in which a lens holder 152 mounting an object lens 151 is passed through an upright supporting shaft 154 mounted on a supporting base plate 153 so as to be driven along and around the supporting Shaft 154. This axial sliding rotating type object lens driving device is so arranged that a focusing driving coil 155 is wound about the peripheral surface of the lens holder 152 and a tracking driving coil 156 is joined to the focusing driving coil 155, while a magnetic circuit made up of magnets 157, 157 and yokes 158, 158 is provided facing the coils 155, 156 on the supporting base plate 153 so as to be operated as an electromagnetic driving unit. Controlling currents conforming to focusing error signals and tracking error signals generated on detection of the reflected return light from the signal recording surface of the optical disc are supplied to the focusing driving coil 155 and the tracking driving coil 156, respectively, for driving and shifting the lens holder 152 along and around the supporting shaft 154. By actuating the lens holder 152 in this manner, the object lens 151, mounted at an offset position relative to the center of rotation of the lens holder 152, is driven and shifted in both the focusing and tracking directions for achieving focusing and tracking control of the optical beam with respect to the optical disc.

FIG.2 shows another example of an object lens driving device which is of a wire-supported type in which a lens holder 202 mounting an object lens 201 is supported in a cantilever fashion on a supporting base plate 203 by four metal wires 210 having their proximal ends supported by a mounting plate 204 mounted upright on the supporting base plate 203 so that shifting of these wires causes the object lens 201 to be shifted in a direction along the optical axis of the object lens 201 and a direction normal thereto. With the wire-supported type object lens driving device, a focusing driving coil is wound around the peripheral surface of the lens holder 202 and a tracking controlling coil 206 is joined to the focusing driving coil 205, while a magnetic circuit made up of magnets 207, 207 and yokes 208, 208 is provided facing the coils 205, 206 on the supporting base plate 203 so as to be operated as an electromagnetic driving device. Controlling currents conforming to focusing error signals and tracking error signals generated on detection of the reflected return light from the signal recording surface of the optical disc are supplied to the focusing driving coil 205 and the tracking driving coil 206, respectively, for resiliently biasing the four wires 210 supporting the lens holder 202 for shifting the object lens 201 mounted on the lens holder 202 in a direction along its optical axis and in a direction normal thereto. With the object lens 201 thus shifted, focusing and tracking control of the light, beam relative to the optical disc may be achieved.

FIG.3 shows still another example of the object lens driving device which is of a mold-hinge type in which a lens holder 302 mounting an object lens 301 is supported on a supporting base plate 303 by a supporting arm 304 molded from synthetic resin for supporting the object lens 301 mounted on the lens holder 302 for movement in a direction along the optical axis of the object lens 301 and in a direction normal thereto. The supporting arm 304 of the object lens driving device is formed with first and second hinges 310, 310, 311, 311 extending in a direction along the optical axis of the object lens 301 and in a direction normal thereto. With deflection of the hinges 310, 311 of the supporting arm 304, the object lens 301 mounted on the lens holder 302 is shifted in the above-mentioned two perpendicular directions. The supporting arm 304 has a proximal side supporting block 312 supported by mounting shafts 313, 313 mounted upright on the supporting base plate 303. The lens holder 302 is supported by a lens holder supporting block 315 provided at a distal end of parallel supporting arms 314, 314 extended from the supporting block 312 and supported in this manner on the supporting base plate 303. The first hinges 310, 310, parallel to the optical axis of the object lens 301, are formed on both ends of the parallel supporting arms 314, while the second hinges 311, 311 extending normal to the optical axis of the object lens 301 are formed between the supporting block 312 and the parallel supporting arm 314 and between the lens holder supporting block 315 and the parallel supporting arm 314.

With the above-described molded-hinge type object lens driving device, the electromagnetic driving unit for driving and shifting the object lens 301 in a direction along the optical axis and in a direction normal thereto is made up of a pair of square-shaped focusing driving coils 305, mounted on both sides of the lens holder 302, tracking controlling coils 306 joined to lateral sides of these focusing driving coils 305 and a magnetic circuit, comprised of magnets 307, 307 and yokes 308, 308 provided on the supporting base plate 303 for facing the coils 305, 306.

Controlling currents conforming to focusing error signals and tracking error signals generated on detection of the reflected return light from the signal recording surface of the optical disc are supplied to the focusing driving coil 305 and the tracking driving coil 306, as in the case of the above-mentioned first, and second examples, for resiliently biasing the first, and second hinges 310, 311 of the supporting arm 304 supporting the lens holder 302 for shifting the object, lens 301 mounted on the lens holder 302 in a direction along its optical axis and in a direction normal thereto. With the object lens 301 thus shifted, focusing and tracking control of the light beam relative to the optical disc may be achieved.

With the above-described axial sliding and rotating type object, lens driving device, shown in FIG. 1, the lens holder 152 is supported for sliding and for being rotated along the supporting shall; 154 and around the supporting shaft by passing the supporting shaft 154 through an engaging hole 152a formed in he lens holder 152 mounting the object lens 151. Thus the lens holder may become unable to be slid and rotated along and around the supporting shaft 154 unless the engaging hole 152a in the lens holder 152 and the supporting shaft 154 are correctly sized relative to each other. If the engaging hole 152a is larger in size than the diameter of the supporting shaft 154, sliding and rotation of the lens holder 152 is accompanied by vibrations. Conversely, if the engaging hole 152a is smaller in size than the diameter of the supporting shaft 154, the sliding load of the lens holder 152 relative to the supporting shaft 154 becomes excessive so that driving cannot be made in conformity to the focusing and tracking control signals. That is, unless the engaging hole 152a in the lens holder 152 and the supporting shaft 154 are correctly sized relative to each other, the lens holder 152 cannot be slid or rotated smoothly along the axis of the supporting shaft 154 or around the supporting shaft 154, so that the object lens 151 cannot be moved smoothly in the direction along the optical axis or in the direction normal thereto and hence focusing and tracking control operations cannot be performed accurately in conformity to the focusing and tracking control signals. The result is that information signals cannot be recorded or reproduced with satisfactory recording/playback characteristics.

Thus the axial sliding and rotating type object lens driving device suffers from the problem that the assembling operation cannot be performed without difficulties.

With the above-described wire-supported type object lens driving device, shown in FIG.2, in which the lens holder is supported using the above-mentioned metal wires 210, the object lens 201 cannot be shifted accurately in the direction along the optical axis and in the direction normal thereto in accordance with focusing controlling signals and tracking controlling signals, unless the four metal wires 210 supporting the lens holder 202 are mounted between the lens holder 202 and the mounting plate 204 with high parallelism to each other, such that accurate focusing and tracking controlling operations cannot be achieved. The result is that recording and reproduction of the information signals cannot be performed with good recording/playback characteristics.

Thus the wire-supported type object lens driving device also suffers from the problem that the assembling operation cannot be performed without difficulties.

With the above-described molded-hinge type object lens driving device, shown in FIG. 3, in which the lens holder 302 is supported by the supporting arm 304 molded from synthetic resin, it is extremely difficult to mold the supporting arm 304 integrally from synthetic resin. Above all, it is difficult to maintain high machining precision of the hinge part of the supporting arm 304 molded from synthetic resin. Unless the high machining precision of the hinged part is maintained, the object lens 301 cannot be shifted accurately responsive to the focusing and tracking controlling signals in the direction along the optical axis and in the direction normal thereto, such that it becomes impossible to perform accurate focusing and tracking controlling operations. As a result, recording/reproduction of information signals cannot be performed with good recording/reproducing characteristics.

Thus the molded-hinge type object lens driving apparatus suffers from the problem that component parts such as supporting arms can be molded and machined extremely difficultly.

OBJECTS AND SUMMARY OF THE INVENTION

It is therefore an object of the present invention to provide an object lens driving apparatus whereby the problems inherent in the above-mentioned axial sliding rotating type object lens driving apparatus, wire-supported type object lens driving apparatus or in the molded-hinge type object lens driving apparatus can be overcome.

It is another object of the present invention to provide an object lens driving apparatus which can be assembled easily.

It is a further object of the present invention to provide an object lens driving apparatus in which accurate focusing and tracking controlling operations can be achieved in conformity accurately to the focusing and tracking controlling signals.

It is a further object of the present invention to provide an object lens holder enabling such object lens driving apparatus to be assembled continuously and produced in large quantities, and a method for producing such object lens holder.

It is yet another object of the present invention to provide an object lens holder block enabling the object lens driving apparatus to be assembled continuously and produced in large quantities.

The object lens holder according to the present invention is constituted by abutting and interconnecting a first bobbin half and a second bobbin half each provided with at least a pair of resilient deflecting members, and may be resiliently deflected via resilient deflecting members of the bobbin halves abutted and interconnected to each other.

The method for producing the object lens holder according to the present invention comprises abutting and interconnecting first and second bobbin halves formed integrally of synthetic resin to a thin sheet member formed with resilient deflecting members, and severing these abutted and interconnected first and second bobbin halves from the sheet-like member. The object lens holder may be resiliently deflected via resilient deflecting members formed integrally with the first and second bobbin halves.

With the object lens holder block according to the present invention, plural bobbin halves are integrally molded with base pieces integrally formed with one of the first and second parallel strip-shaped portions provided with positioning holes and interconnected by plural connecting pieces, so that the bobbin halves may be abutted and interconnected with the positioning holes formed in the first and second strip-shaped portions as the reference. The positioning holes bored in the first and second strip-shaped portions integrally molded with the bobbin halves may be used as perforations engaged by feed pins of a feed unit of an automatic assembling machine so that the strip-shaped portions may be automatically fed for assembling the bobbin halves together.

The object lens driving device according to the present invention includes the above-mentioned object lens holders each holding the object lens, a focusing controlling driving section for driving and displacing said object lens provided in each of said object lens holders in a direction along the optical axis of said object lens, a tracking controlling driving section for driving and displacing said object lens in a direction normal to the optical axis of said object lens and traversing a recording track of said disc-shaped recording medium, and a supporting base plate supporting said object lens holder for driving and displacing said object lens.

Other objects and advantages of the present invention will become apparent from the following description.

DESCRIPTION OF THE PREFERRED EMBODIMENTS

Referring to the accompanying drawings, an object lens holder according to the present invention, the method for producing the object lens holder, an object lens holder block according to the present invention and an object lens driving device constituted by using the object lens holder are hereinafter explained.

FIRST EMBODIMENT

The object lens holder according to the present invention will be first explained.

Figure 4:
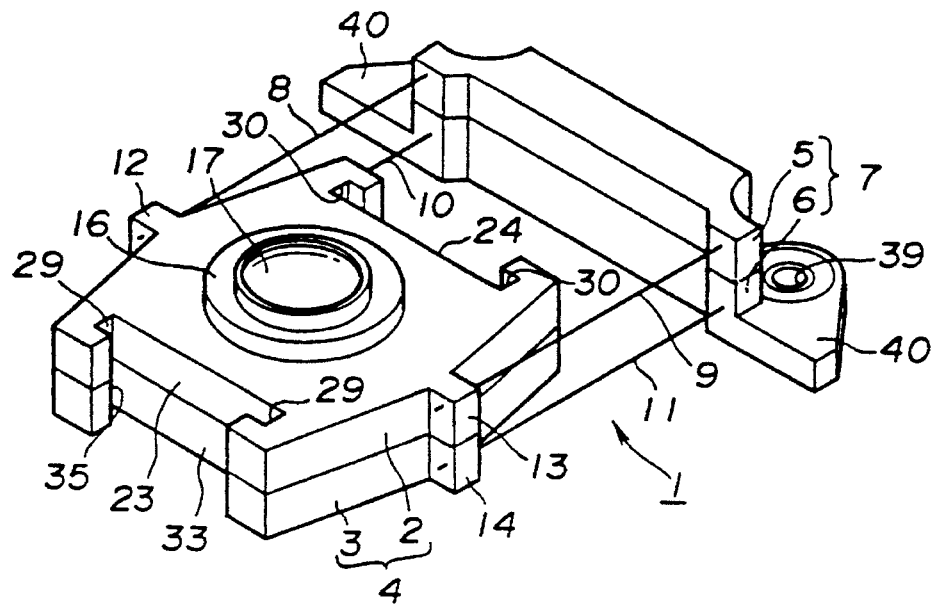
FIG. 4 is a perspective view showing an object lens holder according to the present invention.
Figure 5:
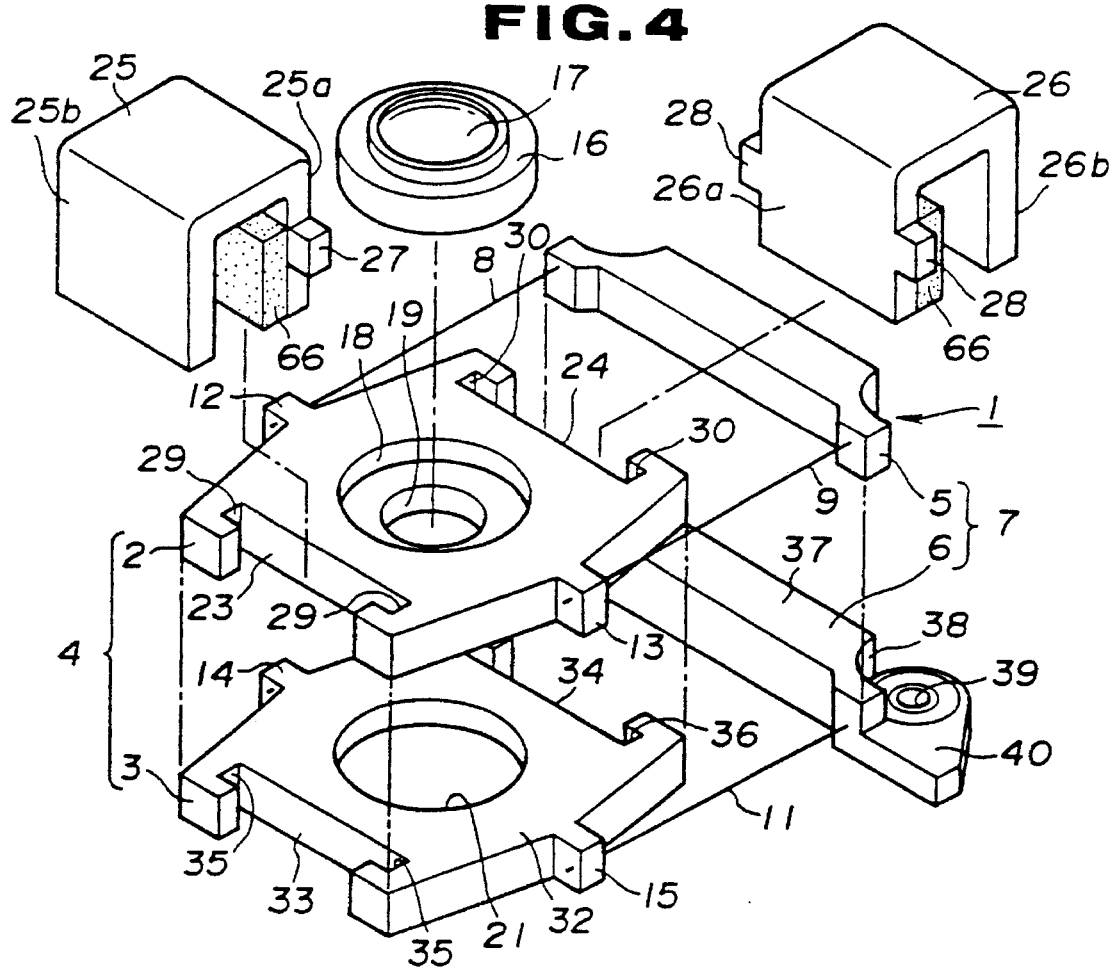
FIG. 5 is an exploded perspective view showing the object lens holder shown in FIG. 4.

Referring to FIGS. 4 and 5, the object lens holder 1 is made up of a bobbin part 4, consisting of an upper or first bobbin half 2 and a lower or second bobbin half 3 abutted and connected to each other, a holder part 7, consisting of an upper or first holder half 5 and a lower or second holder half 6 abutted and connected to each other and functioning as an attachment supporting section to a supporting base plate, first and second resilient deflection members 8, 9 extending parallel to each other for interconnecting the upper bobbin half 2 of the bobbin part 4 and the upper holder half 5 of the holder part 7, and third and fourth resilient deflection members 10, 11 extending parallel to each other and to the first and second resilient deflection members 8, 9 for interconnecting the lower bobbin half 3 of the bobbin part 4 and the lower holder half 6 of the holder part 7.

The upper bobbin half 2 and the lower bobbin half 3, making up the bobbin part 4, and the upper holder half 5 and the lower holder half 6, making up the holder part 7, are formed by molding a synthetic resin having excellent thermal resistance and toughness, such as polyphenylene sulfide resin (PPS resin).

The first to fourth resilient deflection members 8 to 11 are formed into thin elongated wires of a square cross-section by punching a metal sheet, such as a stainless steel sheet of a reduced thickness. When molding the upper bobbin half 2, the lower bobbin half 3, the upper holder half 5 and the lower holder half 6, the resilient deflection members 8 to 11 are inserted or outserted into a mold so that the ends of the deflection members are integrally supported by the upper and lower bobbin halves 2, 3 and by the upper and lower holder halves 5, 6, respectively.

That is, the first and second resilient deflection members 8, 9, provided at the upper bobbin half 2, have their one ends supported by lugs 12, 13 provided at mid parts of both lateral sides of the upper bobbin half 2, while having their other ends supported by the upper holder half 5 for interconnecting the upper bobbin half 2 and the upper holder half 5. At this time, the first and the second resilient deflection members 8, 9 are rendered parallel to each other and interconnect the upper bobbin half 2 and the upper holder half 5. The third and fourth resilient deflection members 10, 11, provided at the lower bobbin half 3, have their one ends supported by lugs 14, 15 provided at mid parts of both lateral sides of the lower bobbin half 3, while having their other ends supported by the lower holder half 6 for interconnecting the lower bobbin half 3 and the lower holder half 6. Similarly to the first and the second resilient deflection members 8, 9, the third and the fourth resilient deflection members 10, 11 are rendered parallel to each other and interconnect the lower bobbin half 3 and the lower holder half 6.

Meanwhile, the other ends of the first and the second resilient deflection members 8, 9 supported by the upper holder half 5 and the other ends of the third and fourth resilient deflection members 10, 11 supported by the lower holder half 6 are interconnected by connecting pieces, as will be explained subsequently.

Figure 6:
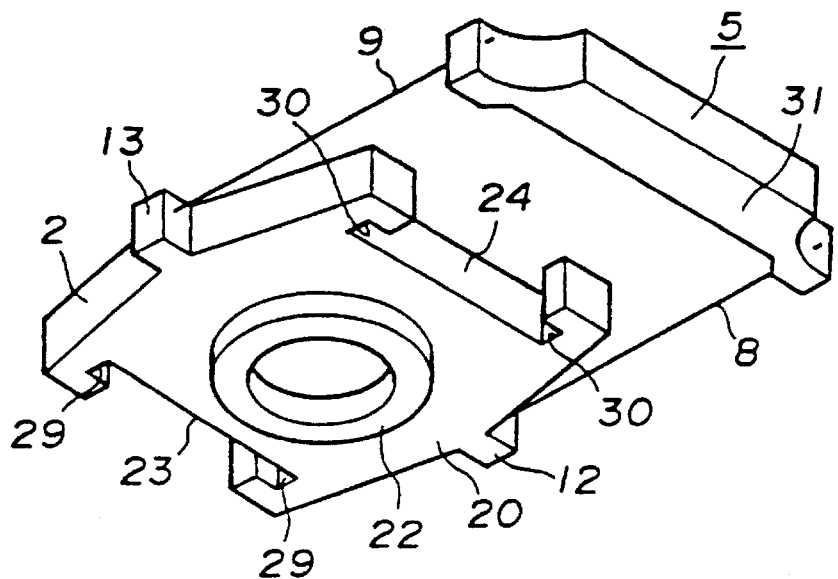
FIG. 6 is a perspective view showing the lower surface of an upper bobbin half.

An object lens 17, held by a lens holding tube 16 of synthetic resin, is mounted on the upper bobbin half 2, by having the tube 16 fitted into a circular lens mounting recess 18 formed on the upper surface of the upper bobbin half 2. Referring to FIG. 4, the object lens 17 is mounted on the upper bobbin half 2 by securing the lens holding tube 16 in the lens mounting recess 18 with an adhesive. The upper bobbin half 2 is provided with a through-hole 19 for transmitting a laser light radiated from a light source, such as a semiconductor laser, through the object lens 17 mounted within the lens mounting recess 18. The through-hole 19 is formed in the upper bobbin half 2 so that its center axis is coincident with the center axis of the lens mounting recess 18 receiving the object lens 17. An abutment lower surface 20 of the upper bobbin half 2, contiguous to the lower bobbin half 3, is a smooth surface at right angles accurately with the optical axis of the object lens 17 mounted within the recess 18. Referring to FIG. 6, a positioning projection 22 engaged with a positioning through-hole 21 of the lower bobbin half 3 for setting the relative position between the upper bobbin half 2 and the lower bobbin half 3 when abutting and connecting these bobbin halves to each other is formed on the abutment lower surface 20. The projection 22 is formed as an annular lug surrounding the laser light transmitting through-hole 19.

The lateral sides of the upper bobbin half 2 normal to the lateral sides thereof along which the first and second resilient deflection members 8, 9 are provided are formed with recesses 23, 24 in which are engaged first and second yokes 25, 26 which are U-shaped in cross-section as shown in FIG. 5 and which constitute a magnetic circuit for shifting the object lens 17 in two perpendicular directions, that is in a direction along the optical axis and a direction normal thereto, when an object lens driving unit is constituted with the use of the object lens holder 1 formed by abutting the upper bobbin half 2 and the lower bobbin half 3 to each other.

Referring to FIG. 5, engaging grooves 29, 30 are formed at both ends of the recesses 23, 24, respectively, for extending along the height of the upper bobbin half 2. Into these engaging grooves 29, 30 are engaged engaging lugs 27, 28 formed on one of arms 25a, 25b, 26a, 26b of the yokes 25, 26, respectively.

Referring to FIG. 5, the other ends of the first and the second resilient deflection members 8, 9 are integrally supported at both lateral sides of the upper holder half 5, connected to the upper bobbin half 2 by means of the first and second resilient deflection members 8, 9. An abutment lower surface 31 of 1;he upper holder half 5 for abutment on the lower holder half 6 is formed as a smooth surface.

Figure 7:
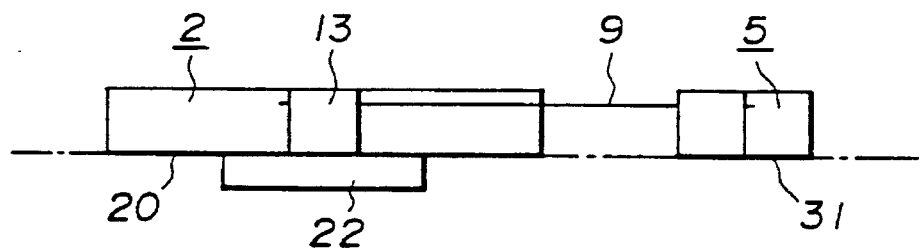
FIG. 7 is a side view showing the upper bobbin half and an upper holder half.

The upper bobbin half 2 and the upper holder half 5 are connected and supported by the first and the second resilient deflection member 8, 9 so that these deflection members 8, 9 remain undeflected, with the abutment surfaces 20 and 21 being in horizontal positions, as shown in FIG. 7.

Referring to FIG. 5, the lower bobbin half 3, joined and connected to the upper bobbin half 2, has the outer plan shape similar to that of the upper bobbin half 2. The lower bobbin half 3 has the central positioning through-hole 21 which is engaged by the positioning projection 22 provided on the lower abutment surface 20 of the upper bobbin half 2 and which is adapted to transmit the laser light towards the object lens 17 mounted on the upper bobbin half 2. The lower bobbin half 3 has an abutment upper surface 32 which is abutted by the abutment lower surface 20 of the upper bobbin half 5 and which is formed as a smooth surface extending normal to the optical axis of the object lens 17 similarly to the lower abutment surface of the upper bobbin half 2.

The opposite lateral sides of the lower bobbin half 3 normal to the direction of extension of the third and fourth resilient deflection members 10, 11 are formed with engaging recesses 33, 34 similar to the recesses 23, 24 formed in the upper bobbin half 2. These engaging recesses 33, 34 are engaged by first and second yokes 25, 26, similarly to the engaging recesses 23, 24 of the upper bobbin half.

On both opposite ends of the engaging recesses 33, 34, engaging grooves 35, 36, engaged by engaging lugs 27, 28 formed on the yokes 25, 26, are formed along the height of the lower bobbin half 3, as in the case of the engaging recesses formed in the upper bobbin half 2, as shown in FIG. 5.

Meanwhile, when the upper bobbin half 2 and the lower bobbin half 3 are abutted to and engaged with each other, the engaging recesses 23, 24 of the upper bobbin half 2 and the engaging recesses 33, 34 of the lower bobbin half 3 each form a continuous engaging recess, as shown in FIG. 4.

The lower holder half 6, joined to the lower bobbin half 3 by means of the third and fourth resilient deflection members 10, 11, has an abutment part 38 having a smooth abutment surface 37 abutted against the upper holder half 5, and supporting projections 40, 40, on both sides of the abutment part 38, provided with holes 39, 39 engaged by stationary pins, not shown, adapted for supporting the ends of the third and fourth resilient deflection members 10, 11, as shown in FIG. 5.

Figure 8:
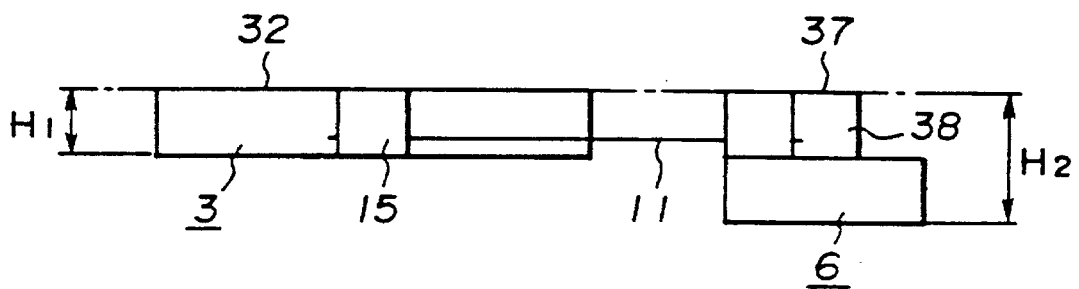
FIG. 8 is a side view showing a lower bobbin half and a lower holder half.

The lower bobbin half 3 and the lower holder half 6 are interconnected and supported by the third and the fourth resilient deflection members 10, 11, with the third and the fourth resilient deflection members 10, 11 not being deflected and with the abutment upper surfaces 32, 37 being in the horizontal position, as shown in FIG. 8.

The lower holder half 6 has a height $H_2$ larger than the height $H_1$ of the lower bobbin half 3, as shown in FIG. 8. That is, the lower holder half 6 is designed to have a height difference to permit a portion of the bobbin part 4 to be moved in the direction along the optical axis without being contacted with the supporting base plate when the object lens holder 1 is formed and supported on the supporting base plate with the lower holder half 6 as a mounting support as later explained and the object lens holder 1 so formed and supported is assembled into an object lens driving device so that the bobbin part 4 is movable along the optical axis of the object lens 17.

The above described upper bobbin half 2 and the upper holder half 5 are abutted and joined to the lower bobbin half 3 and the lower holder half 6 in the following manner to form the object lens holder 1.

First, the positioning projection 22 of the lower bobbin half 2 is engaged in the positioning through-hole 21 of the lower bobbin half 3 and the abutment surfaces 20, 32 of the upper bobbin half 2 and the lower bobbin half 3 are abutted to each other. Since the upper and lower bobbin halves are of the same outer shape, the outer sides thereof are flush with each other. Simultaneously with abutment of the upper and lower bobbin halves 2 and 3, the abutment surface 31 of the upper holder half 2 is abutted against the abutment surface 37 of the lower holder half 6.

When the upper bobbin half 2 and the upper holder half 5 are abutted in this manner against the lower bobbin half 3 and the lower holder half 6, respectively, they are abutted on the smooth parallel abutment joining surfaces 20, 32 and 31, 37, so that the first and second resilient deflection members 8, 9, rendered parallel to each other, are positioned parallel to the third and the fourth resilient deflection members 10, 11, similarly rendered parallel to each other.

With the upper bobbin half 2 abutted against the lower bobbin half 3 and with the upper holder half 5 abutted against the lower holder half 6, the abutment surfaces 20 and 32 of the upper and lower bobbin halves 2 and 3 are joined together with an adhesive or by ultrasonic welding, while the abutment surfaces 31, 37 of the upper and the lower holder halves 5 and 6 are similarly joined together with an adhesive or by ultrasonic welding to produce an object lens holder 1 as shown in FIG. 4.

Figure 9:
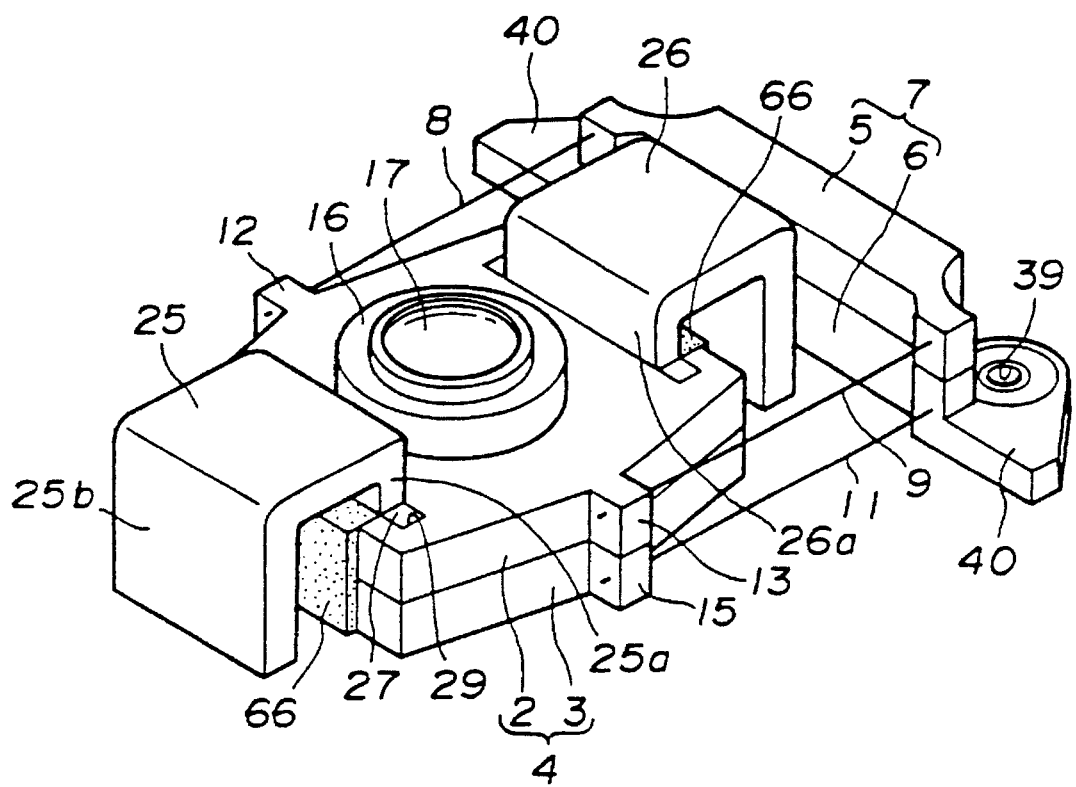
FIG. 9 is a perspective view of an object lens holder showing an object lens and a yoke mounted on a bobbin part.

The first and the second yokes 25, 26 are engaged and fitted in the above-described object lens holder 1, These yokes are mounted on opposite sides of the object lens holder 1 by engaging the lugs 27, 28 on one of the arms 25a and 26a thereof in the continuous grooves 29, 35 and 30, 36 in the upper and lower bobbin halves 2 and 3 and by engaging the lugs 27, 28 in the engaging recesses 23, 33 and 24, 34, as shown in FIG. 9. Permanent magnets 66, 66 are provided on the inner lateral surfaces of the arms 25a, 26a facing the arms 25b and 26b.

The method of producing the object lens holder 1 by abutting and joining the upper and lower bobbin halves 2 and 3 and the upper and lower holder halves 5 and 6 together is hereinafter explained.

Figure 10:
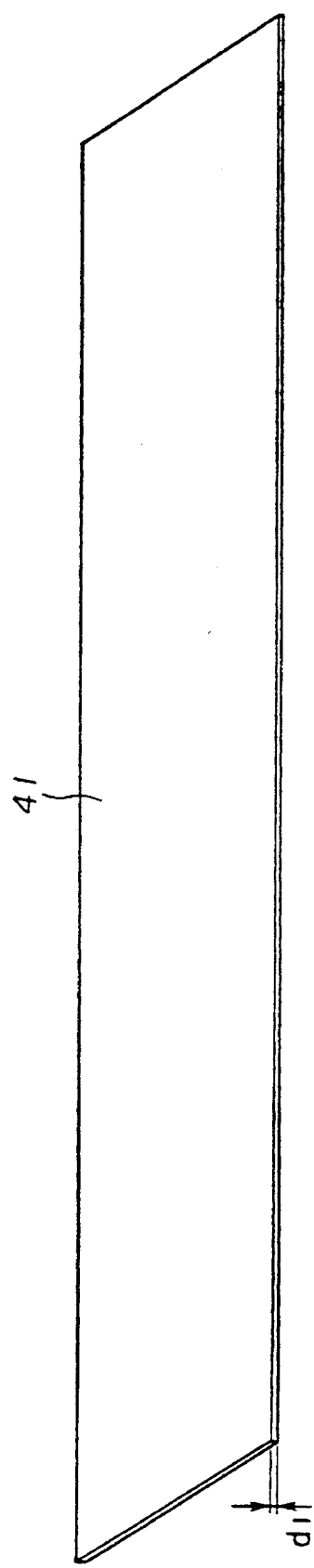
FIG. 10 is a perspective view showing a thin sheet member employed for forming an object lens holder according to the present invention.

For producing the object lens holder 1, a thin metal sheet 41, such as a thin strip-shaped stainless steel sheet, having a thickness $d_1$ of an order of 0.2 mm, as shown in FIG. 10, is prepared.

The thin sheet member 41 is punched by a punching device for producing an upper reed frame 42 for the upper bobbin halves 2 and the upper holder halves 5 and a lower reed frame 43 for the lower bobbin halves 3 and the lower holder halves 6.

The upper reed frame 42 is first explained.

Figure 11:
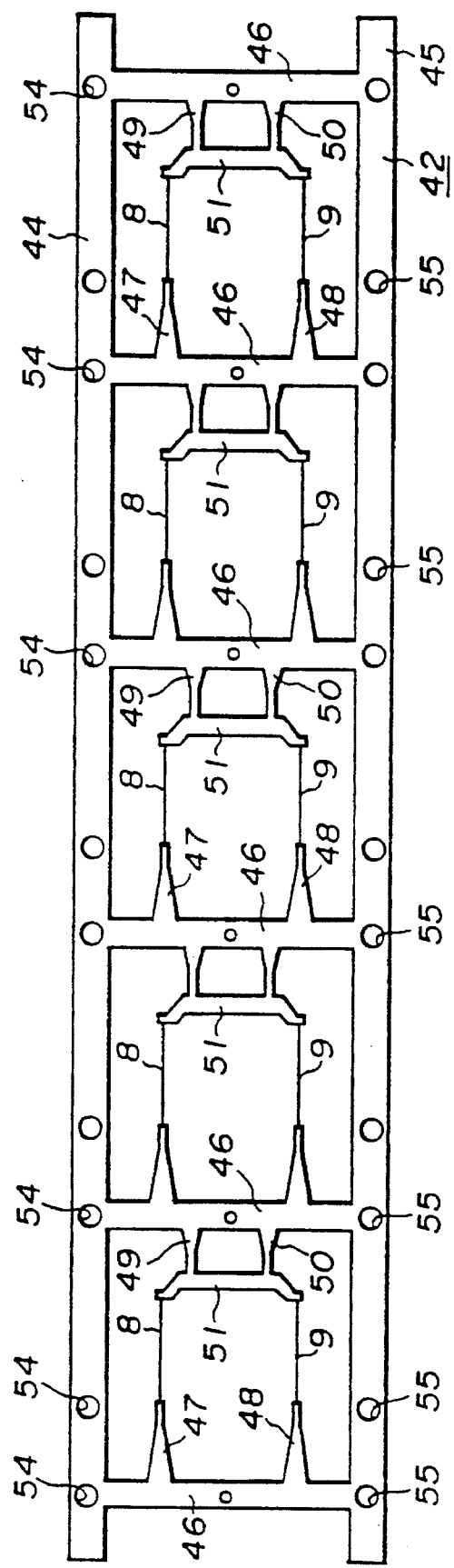
FIG. 11 is a plan view showing an upper reed frame produced by punching a thin sheet member.
Figure 12:
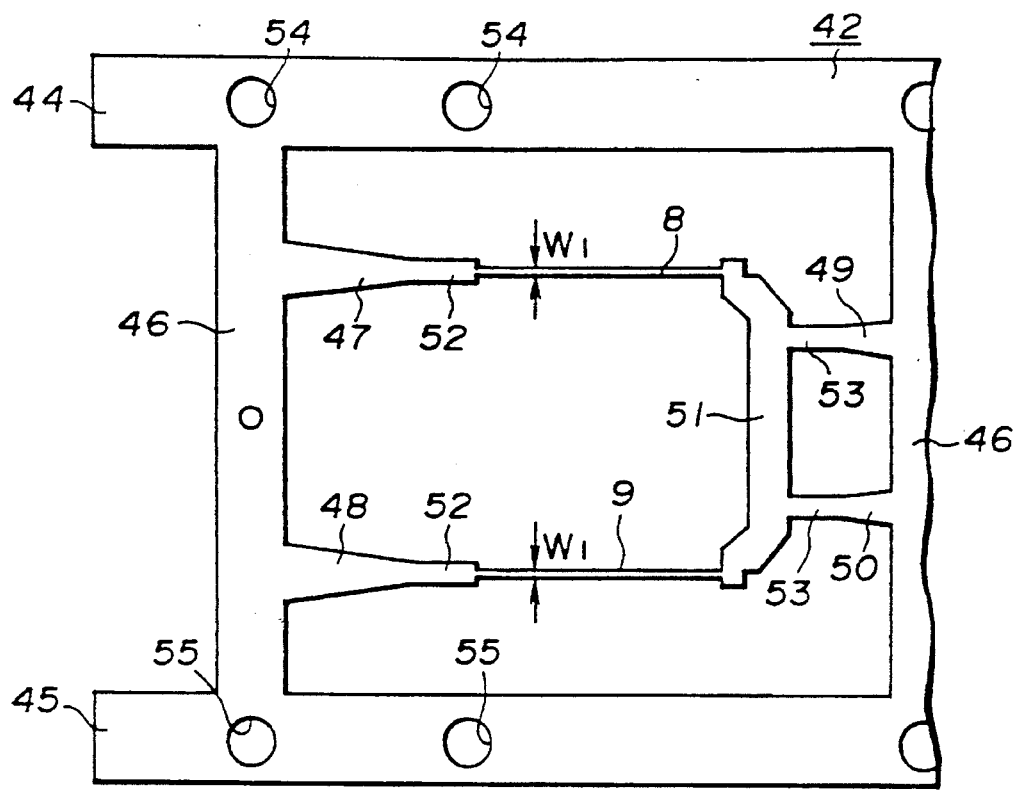
FIG. 12 is an enlarged partial plan view of the upper reed frame shown in FIG. 11.

Referring to FIGS. 11 and 12, the upper reed frame 42 has a first strip-shaped portion and a second strip-shaped portion 45 on both longitudinal sides thereof, and a large number of connecting pieces 46 interconnecting the first and second strip-shaped portions 44 and 45.

From a lateral side of the connecting piece 46 are integrally projected a pair of base pieces 47, 48 for the upper bobbin half with which the upper bobbin half 2 is molded integrally. From the opposite lateral side of the connecting piece 46 towards the base pieces 47, 48 are similarly integrally projected base pieces 49, 50 for the upper holder half with which the upper holder half 5 is molded integrally.

An upper holder half reinforcement 51 is formed at the distal ends of the base pieces 49, 50 for interconnecting these base pieces 49, 50. This upper holder half reinforcement 51 is embedded in the upper holder half 5 to be produced by molding synthetic resin for increasing mechanical strength of the upper holder half 5.

The first and the second resilient deflecting members 8, 9, each having a thickness $w_1$ approximately equal to the thickness $d_1$ of the thin sheet member 41 of the upper reed frame 42, are formed for extending between the distal ends of the base pieces 47, 48 for the upper bobbin half and the reinforcement 51. The first and the second resilient deflection members 8, 9 are formed with the same width $w_1$ as the thickness $d_1$ of the thin sheet member 41 of the upper reed frame 42 so that the cross-sectional shape is rectangular and the force of deflection in each of two perpendicular directions remains substantially the same. These resilient deflecting members 8, 9 are maintained accurately parallel to each other and extended between the base pieces 47, 48 for the upper bobbin half and the reinforcement piece 51 for the upper holder half 51.

The distal ends of the base pieces 47, 48 for the upper bobbin half are each formed as a weakened section 52 of a narrower width than the proximal sides thereof connecting to the connecting piece 46. Similarly, the distal ends of the base pieces 49, 50 for the upper holder half which are to be connected to the upper holder half reinforcement 51 are each formed as a weakened section 53 of a narrower width than the proximal sides thereof connecting to the connecting piece 46.

Meanwhile, the leftmost connecting piece 46 of the upper reed frame 42 in FIG. 11 is provided only with the base pieces 47, 48 for the upper bobbin half, whereas the rightmost connecting piece 46 in FIG. 11 is provided only with base pieces 49, 50 for the upper holder half.

The first band-shaped portion 44 and the second band-shaped portion 45 are provided with assembling guide holes 54, 55 for achieving position matching between the upper bobbin half 2 and the lower bobbin half 3 and between the upper holder half 5 and the lower holder half 6 when these halves are put together to form the object lens holder 1 with the aid of an automatic assembling machine. These assembling guide holes 54, 55 are formed at both ends of the connecting pieces 46 at a position registering with a centerline of the upper bobbin half 2 which is formed with the aid of the base pieces 47, 48 for the upper bobbin half as will be explained subsequently.

The lower reed frame 43 is explained.

Figure 14:
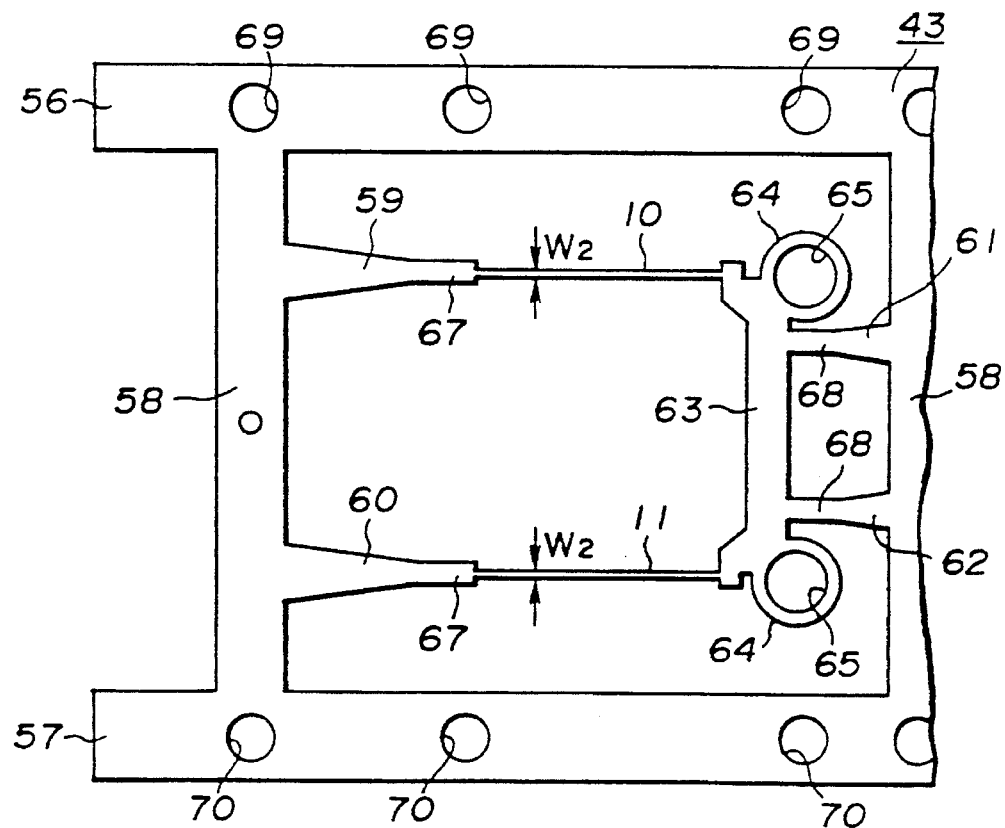
FIG. 14 is an enlarged partial plan view of the lower reed frame shown in FIG. 11.
Figure 13:
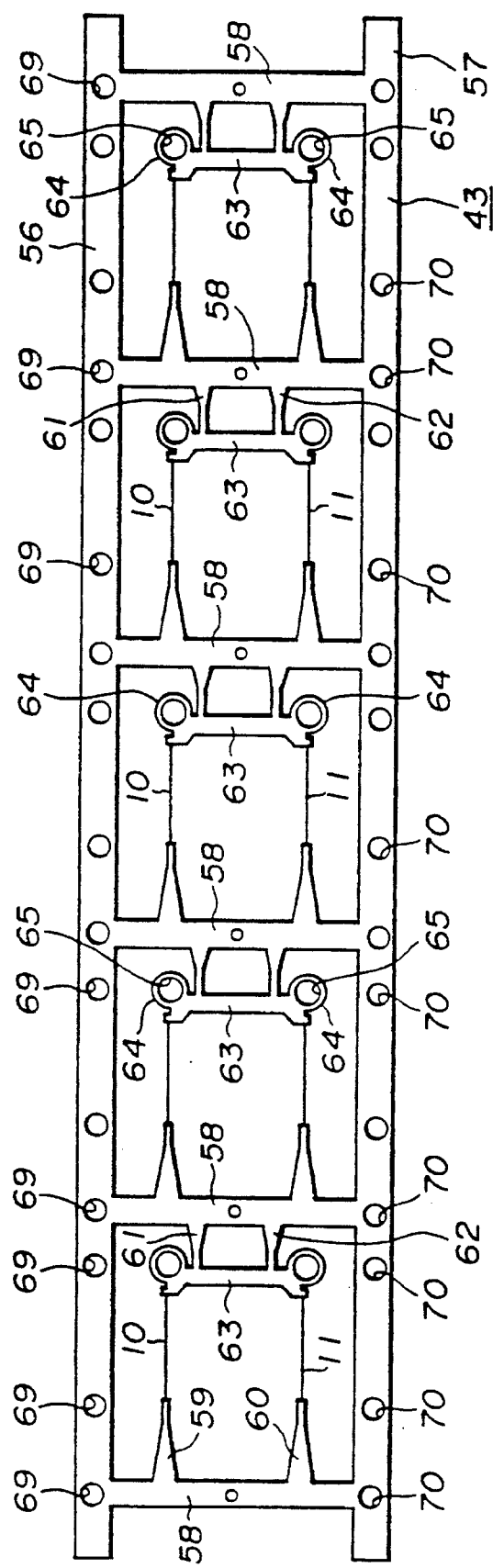
FIG. 13 is a plan view showing a lower reed frame produced by punching the thin sheet member.

The lower reed frame 43 is constructed similarly to the upper reed frame 42. Referring to FIGS. 13 and 14, the lower reed frame 43 has a first strip-shaped portion 56 and a second strip-shaped portion 57 on both longitudinal sides and a large number of connecting pieces 58 interconnecting the first and second strip-shaped portions 56 and 57.

From a lateral side of the connecting piece 58 are integrally projected a pair of base pieces 59, 60 for the upper bobbin half with which the lower bobbin half 3 is molded integrally. From the opposite lateral side of the connecting piece 58 towards the base pieces 59, 60 are similarly integrally projected base pieces 61, 62 for the upper holder half with which the lower holder half 6 is molded integrally. A lower holder half reinforcement piece 63 is formed at the distal ends of the base pieces 61, 62 for interconnecting these base pieces 61, 62. This upper holder half reinforcement piece 63 is embedded in the lower holder half 6 to be produced by molding synthetic resin for increasing mechanical strength of the lower holder half 6.

On both sides of the lower holder half reinforcement piece 63, there are integrally formed supporting projection reinforcements 64, 64 connected to the supporting projections 40, 40 of the lower holder half 6 provided with the engaging holes 39, 39 for reinforcing these supporting projections 40, 40. These reinforcements 64, 64 are provided with through-holes 65, 65 in register with the engaging holes 39, 39.

The third and the fourth resilient deflecting members 10, 11, each having a thickness $w_2$ approximately equal to the thickness $d_2$ of the thin sheet member 41 of the lower reed frame 43, are formed for extending between the distal ends of the base pieces 59, 60 for the lower bobbin half and the reinforcement 63. The third and the fourth resilient deflection members 10, 11 are formed with the same width $w_2$ as the thickness $d_1$ of the thin sheet member 40 of the reed frame 41 so that the cross-sectional shape is rectangular and the force of deflection in each of two perpendicular directions remains substantially the same. These third and fourth resilient deflecting sections 10, 11 are provided between the base pieces 59, 60 for the lower bobbin half and the reinforcement for the lower half 63 so as to be accurately parallel to each other as are the first and the second resilient deflecting members 8 and 9 with the same distance in-between as that between the first and the second resilient deflecting members 8 and 9 for the upper reed frame 41.

The distal ends of the base pieces 59, 60 for the lower bobbin half are each formed as a weakened section 67 of a narrower width than the proximal sides thereof connecting to the connecting piece 46. Similarly, the distal ends of the base pieces 61, 62 for the lower holder half are each formed as a weakened section 68 of a narrower width than the proximal sides thereof connecting to the connecting piece 58.

Meanwhile, the leftmost connecting piece 58 of the lower reed frame 43 in FIG. 13 is provided only with the base pieces 59, 60 for the lower bobbin half, whereas the rightmost connecting piece 58 in FIG. 13 is provided only with base pieces 61, 62 for the lower holder half.

The first band-shaped portion 56 and the second band-shaped portion 57 are provided with assembling guide holes 69, 70 for position matching between the upper bobbin half 2 and the lower bobbin half 5 and between the upper holder half 5 and the lower holder half 6 when these halves are put together to form the object lens holder 1 with the aid of an automatic assembling machine. These assembling guide holes 69, 70 are formed at both ends of the connecting pieces 58 at a position registering with a centerline of the lower bobbin half 3 which is formed with the aid of the base pieces 59, 60 for the lower bobbin half 3 as will be explained subsequently, and at a position registering with a centerline of through-holes 65, 85 formed in the reinforcements 64, 64.

The upper reed frame 42 and the lower reed frame 43, thus produced by punching the thin sheet, member 41, are molded with synthetic resin for forming the upper bobbin half 2, the upper holder half 5, the lower bobbin half 3 and the lower holder half 6. For molding, an outsert molding method or an insert molding method is employed.

The manner in which the upper reed frame 42 and the lower reed frame 43 are molded with synthetic resin having excellent thermal resistance and excellent toughness, such as polyphenylene sulfide (PPS) resin, for forming the upper bobbin half 2, upper holder half 5, lower bobbin half 3 and the lower holder half 6, is hereinafter explained.

First of all, the manner in which the upper bobbin half 2 and the upper holder half 5 are formed is explained.

For forming the upper bobbin half 2 and the upper holder half 5, the upper reed frame 42 prepared as explained above is placed within a metal mold of an injection molding machine designed to mold the upper bobbin half 2 and the upper holder half 5, and synthetic resin is injected into the metal mold for producing the upper bobbin half 2 and the upper holder half 5.

The synthetic resin forming the upper bobbin half 2 is injected for burying connecting portions of the first and the second resilient deflecting portions 8, 9 to the base pieces 47, 48 for the upper bobbin half. In this manner, the one sides of the first and the second resilient deflecting members 8 and 9, inclusive of portions of the base pieces 47, 48 for the upper bobbin half, are supported by the supporting lugs 12, 13 for forming the upper bobbin half 2.

The synthetic resin forming the upper holder half 5 injected for burying the upper holder half reinforcement 51 and connecting portions of the first and the second resilient deflecting members 8 and 9 to the upper holder half reinforcement 51. In this manner, the opposite ends of the first and the second resilient deflecting members 8, 9 inclusive of the upper holder half reinforcement 51 are supported for forming the upper holder half 5.

Figure 15:
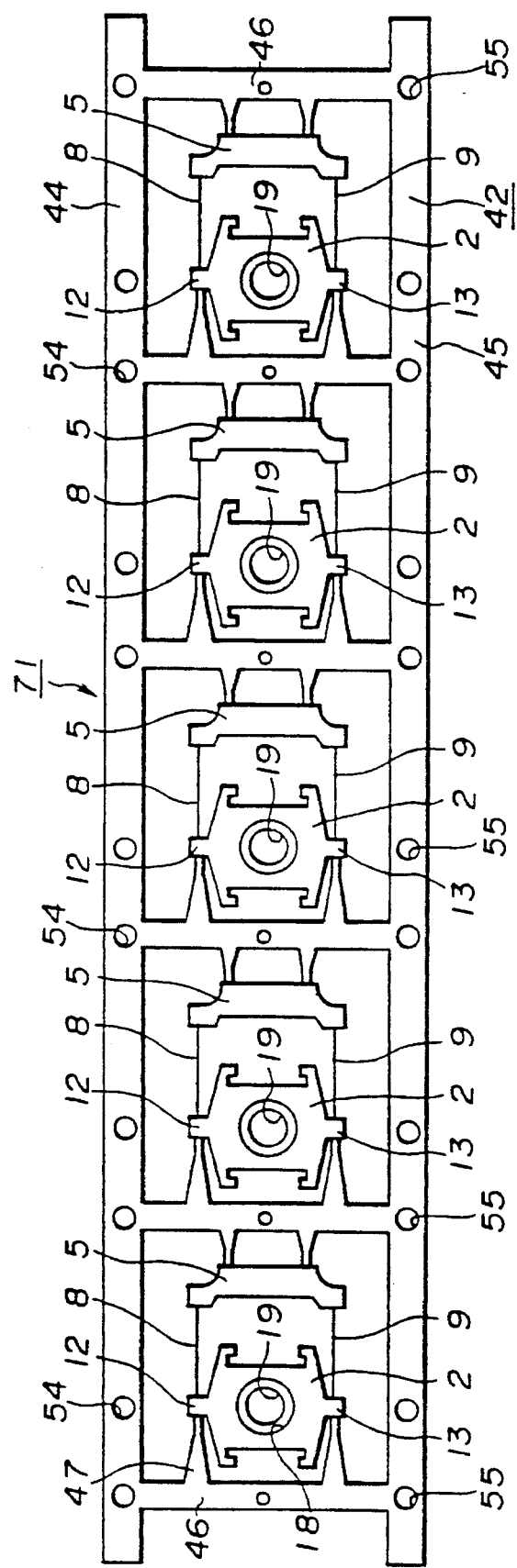
FIG. 15 is a plan view showing an upper object lens holding block member prepared by molding the upper bobbin half and the upper holder half to the upper reed frame.

With the synthetic resin thus injected onto the upper reed frame 42 for forming the upper bobbin half 2 and the upper holder half 5, there halves 2 and 5 are integrally formed on both sides of each connecting piece 46 interconnecting the first and the second strip-shaped portions 44 and 45, as shown in FIG. 15. Thus a set of the upper holder half 2 and the upper holder half 5 is formed in a space defined between adjacent connecting pieces so that a large number of the upper bobbin halves 2 and the upper holder halves 5 are provided lengthwise of the upper reed frame 42 with the connecting pieces 46 in-between.

In this manner, the large number of the upper bobbin halves 2 and the upper holder halves 5, simultaneously formed on one upper reed frame 42, constitute a block of upper object lens holding block members 71.

The block of the upper object lens holding members 71 is loaded on an automatic assembling machine, together with the block of the lower object lens holding members, as later described, for performing an automatic assembly operation.

The manner in which the lower bobbin half 3 and the lower holder half 5 are formed is explained.

For forming the lower bobbin half 3 and the lower holder half 5, the lower reed frame 43 prepared as explained above is placed within a metal mold of an injection molding machine designed to mold the lower bobbin half 3 and the lower holder half 5, and synthetic resin is injected into the metal mold for producing the lower bobbin half 3 and the lower holder half 5, as in the case of forming the upper bobbin half 2 and the upper holder half.

The synthetic resin forming the lower bobbin half 3 is injected for burying connecting portions of the third and the fourth resilient deflecting portions 10, 11 to the base pieces 59, 50 for the lower bobbin half. In this manner, the one sides of the third and the fourth resilient deflecting members 10 and 11, inclusive of portions of the base pieces 59, 60 for the lower bobbin half, are supported by the supporting lugs 14, 15 for forming the lower bobbin half 3.

The synthetic resin forming the lower holder half 6 is injected for burying the lower holder half reinforcement 63 and connecting portions of the third and the fourth resilient deflecting members 10 and 11 to the lower holder half reinforcement 63. In this manner, the opposite ends of the third and the fourth resilient deflecting members 10, 11 inclusive of the lower holder half reinforcement 63 are supported for forming the lower holder half 6. When the synthetic resin is injected in this manner for forming the lower holder half 6, the reinforcements 64, 64 are unified with the supporting lugs 40, 40 in such a manner that the surfaces of the reinforcements 64, 64 face the outside of one surfaces of the supporting lugs 40, 40 of the lower holder half 6.

Figure 16:
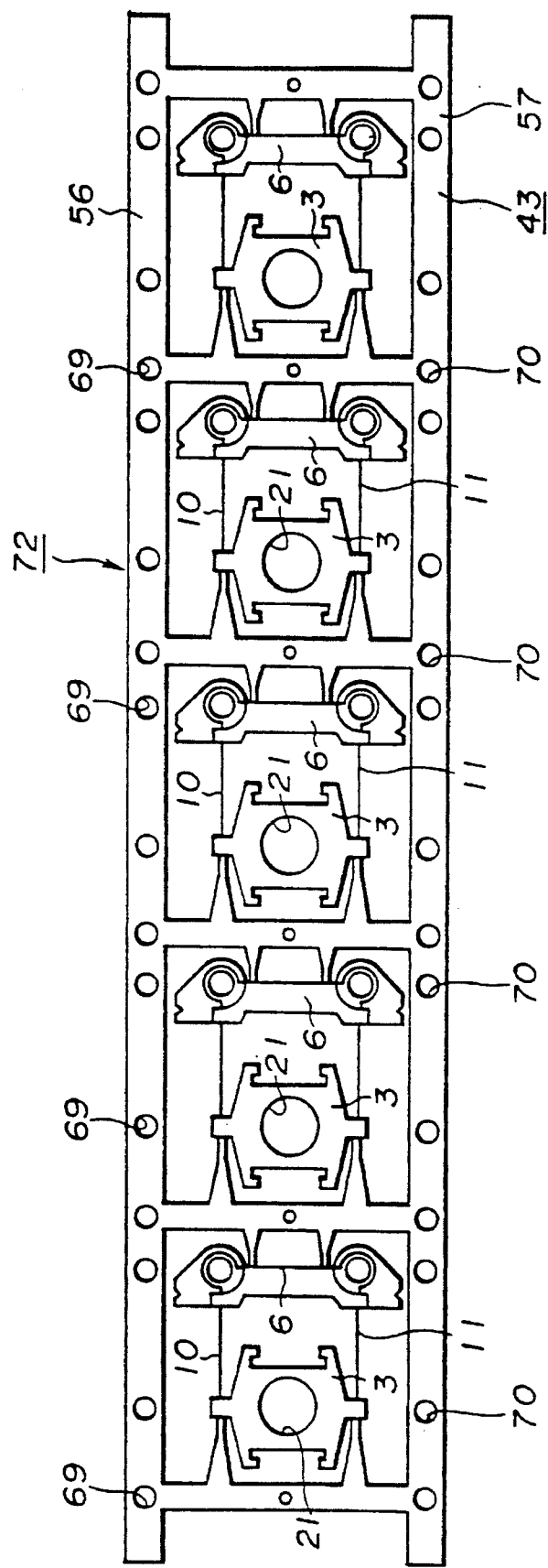
FIG. 16 is a plan view showing a lower object lens holding block member prepared by molding the lower bobbin half and the lower holder half to the lower reed frame.

With the synthetic resin thus injected onto the lower reed frame 43 for forming the lower bobbin half 3 and the lower holder half 6, these halves 3 and 6 are integrally formed on both sides of each connecting piece 58 interconnecting the first and the second strip-shaped portions 56 and 57. Thus a set of the lower bobbin half 3 and the lower holder half 6 is formed in a space defined between adjacent connecting pieces 58 so that a large number of the lower bobbin halves 3 and the lower holder halves 6 are provided lengthwise of the lower reed frame 43 with the connecting pieces 46 in-between, as shown in FIG. 16.

In this manner, the large number of the lower bobbin halves 3 and the lower holder halves 6, simultaneously formed on one lower reed frame 43, constitute a block of lower object lens holder block 72.

The block of the lower object lens holding members 72 is loaded on an automatic assembling machine, together with the block of the above-described upper object lens holding members 71, as later described, for performing an automatic assembly operation.

Figure 17:
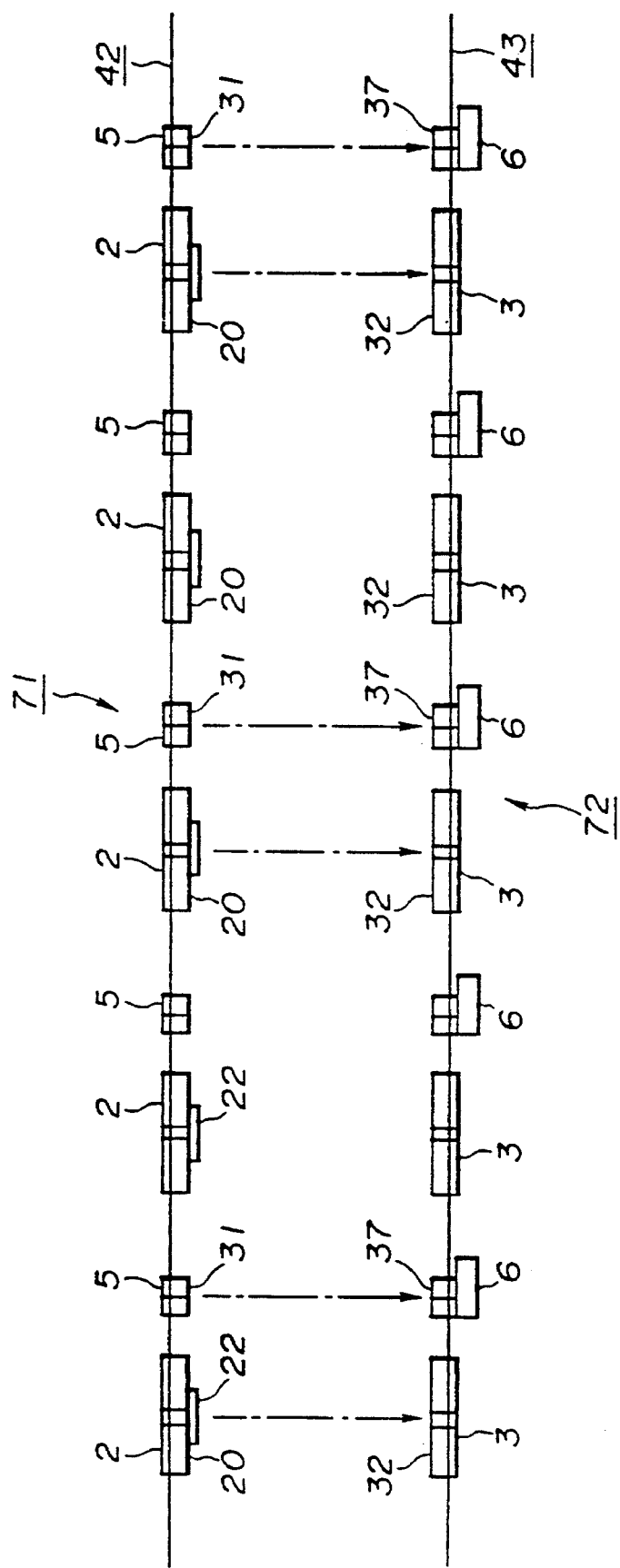
FIG. 17 is a side view showing the state of abutting and joining the upper object lens holding block member to the lower object lens holder block.
Figure 18:
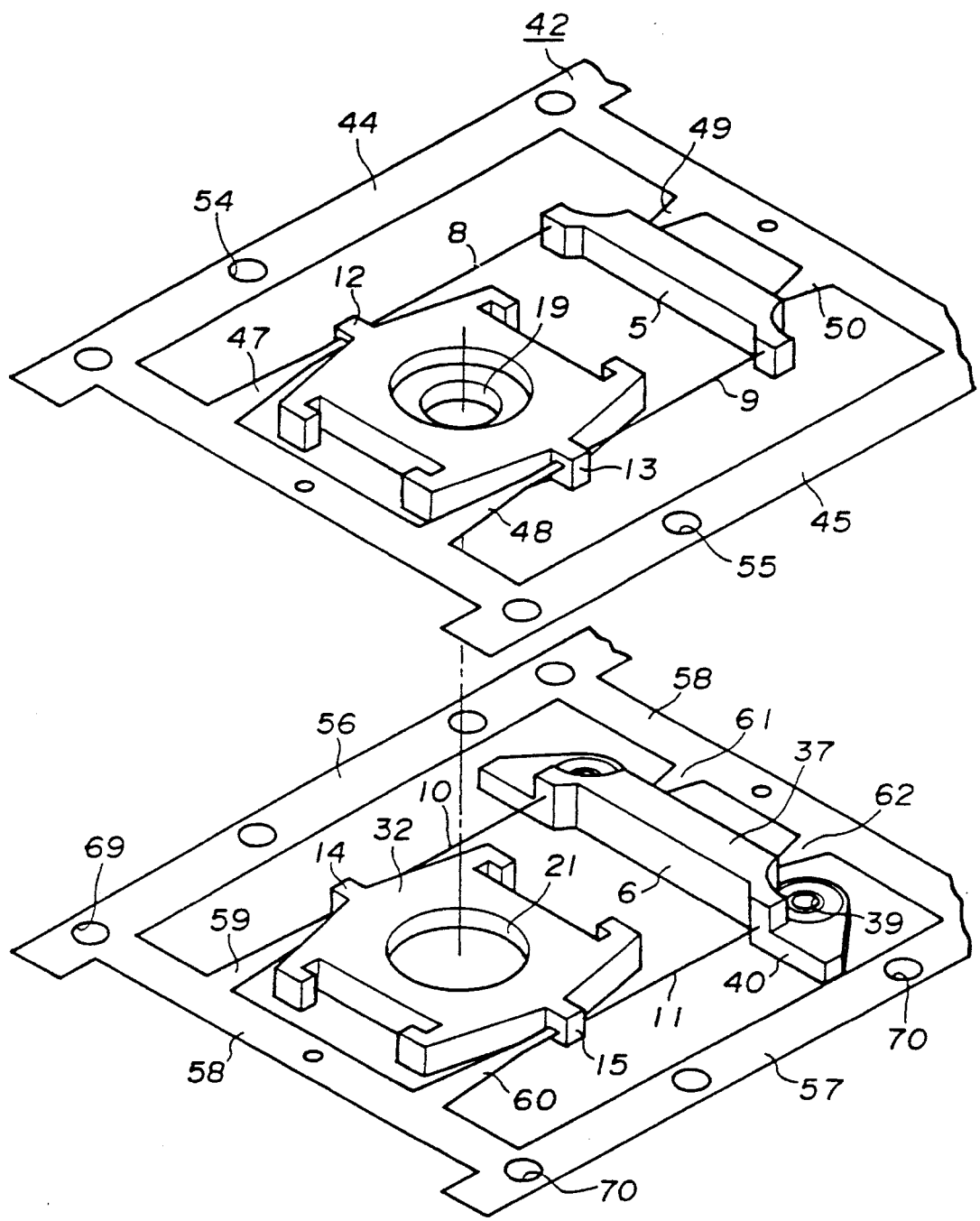
FIG. 18 is an enlarged partial perspective view showing the state of abutting and joining the upper object lens holder block to the lower object lens holding block member.
Figure 19:
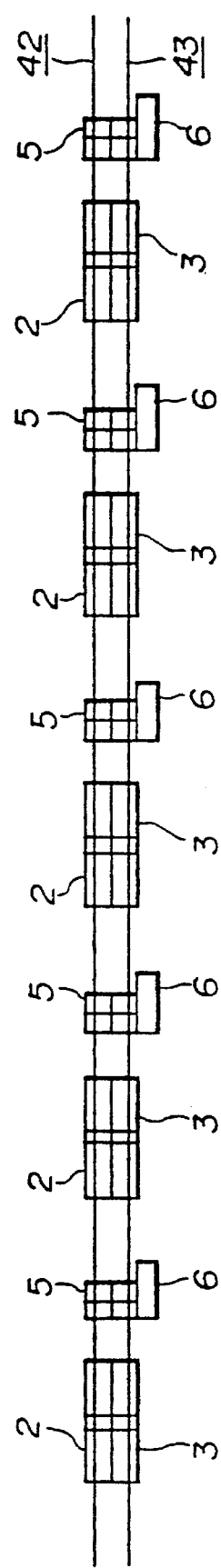
FIG. 19 is a side view showing the state in which the upper lens holder block is just abutted and joined to the lower object lens holder block.

As shown in FIGS. 17 and 18, the block of the upper object lens holding members 71, comprised of the large number of the upper bobbin halves 2 and the upper holder halves 5, interconnected by the upper reed frame 42, and the block of the lower object lens holding members 72, comprised of the large number of the lower bobbin halves 3 and the lower holder halves 6, interconnected by the upper reed frame 43, are placed with the mating abutment surfaces 20, 32 of the upper bobbin half 2 and the lower bobbin half 3 facing each other and with the mating abutment surfaces 31, 37 of the upper holder half 5 and the lower holder half 6 similarly facing each other. The positioning projections 22 of the upper bobbin halves 2 are fitted into the through-holes 21 of the lower bobbin halves 3, at the same time that the abutment surfaces 31, 37 of the upper and lower holder halves 5 and 6 and the abutment surfaces 20, 32 of the upper bobbin halves 2 and the lower bobbin halves 3 are joined together as with an adhesive or by ultrasonic welding, as shown in FIGS. 19 and 20.

Meanwhile, when abutting the upper bobbin halves 2 and the lower bobbin halves 3 or abutting the upper holder halves 5 and the lower holder halves 6, the assembly guide holes 54, 55 in the first and second strip-like portions 44, 45 of the upper reed frame 42 and the assembly guide holes 69, 70 in the first and second strip-like portions 56, 57 of the lower reed frame 43 are used for position matching.

Figure 20:
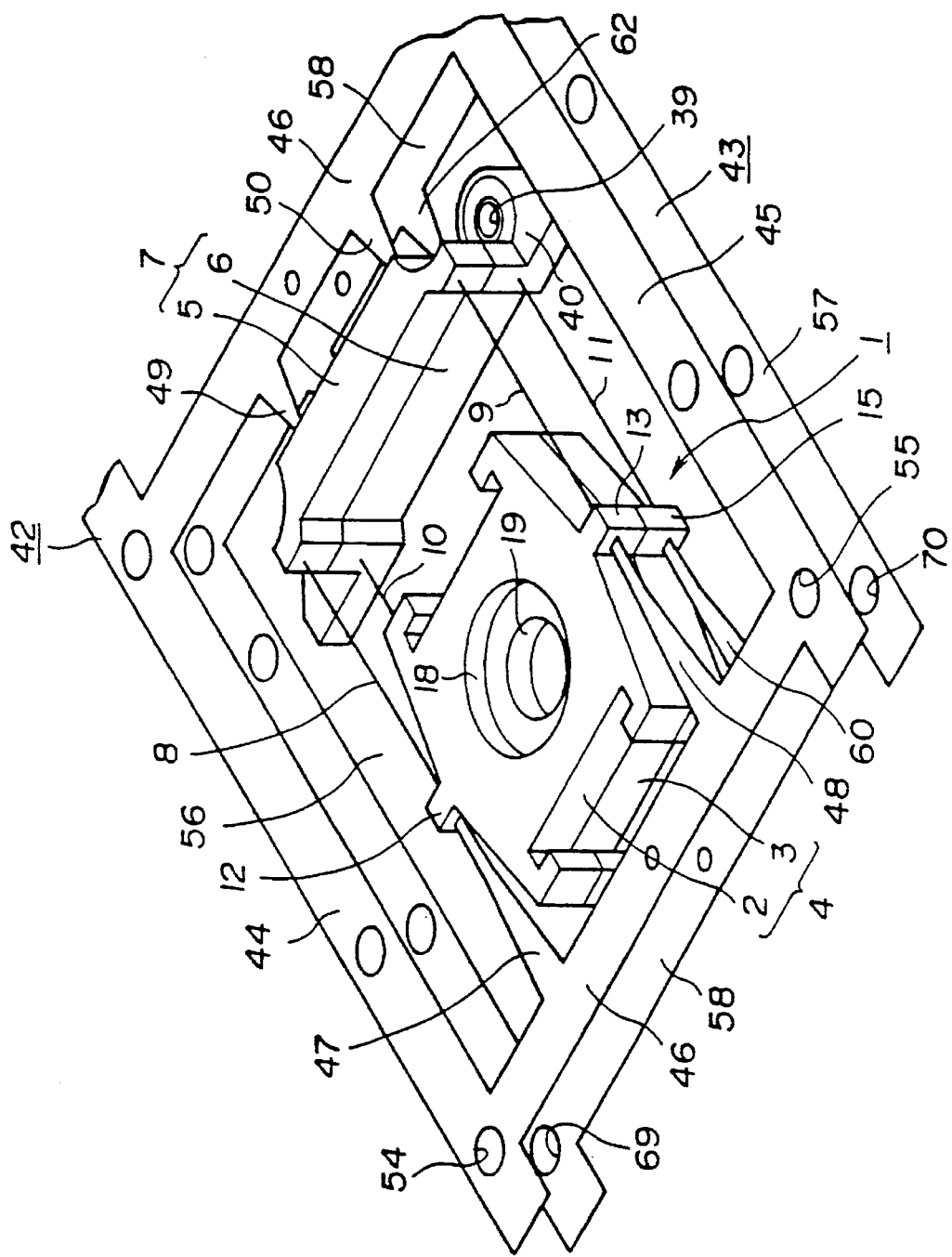
FIG. 20 is an enlarged partial perspective view showing the state in which the upper lens holder block is just abutted and joined to the lower object lens holder block, said upper and lower lens holding block members being joined to the upper and lower reed frames for forming an object lens holder.

When the upper bobbin halves 2 and the lower bobbin halves 3 are abutted and joined to each other and the upper holder halves 5 and the lower holder halves 6 are abutted and joined to each other in this manner, the object lens holder 1 shown in FIG. 20 is formed, in which the bobbin part 4 and the holder part 7 are interconnected by the first resilient deflecting members 8, 9 parallel to each other and by the third and fourth resilient deflecting members 10, 11 parallel to each other and to the first and second deflecting members 8, 9. At this time, a large number of the object lens holders 1 are interconnected by the upper reed frame 42 and the lower reed frame 43.

Figure 21:
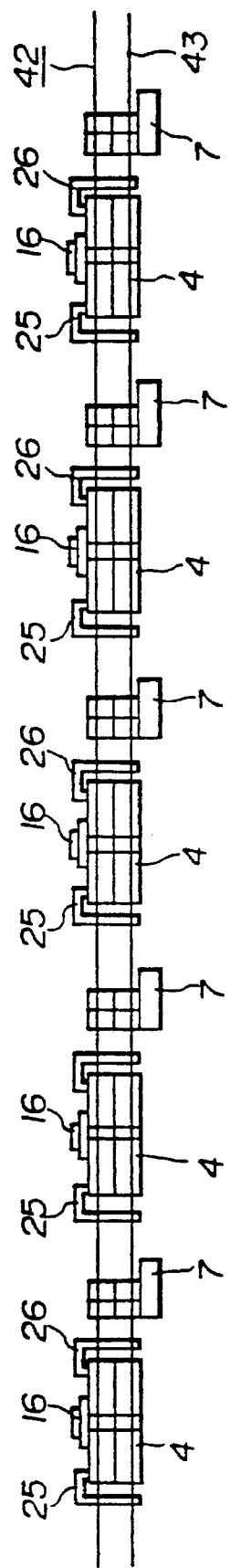
FIG. 21 is a side view showing the state in which an object lens and a yoke are just attached to the object lens holder previously joined to the upper and the lower reed frames.
Figure 22:
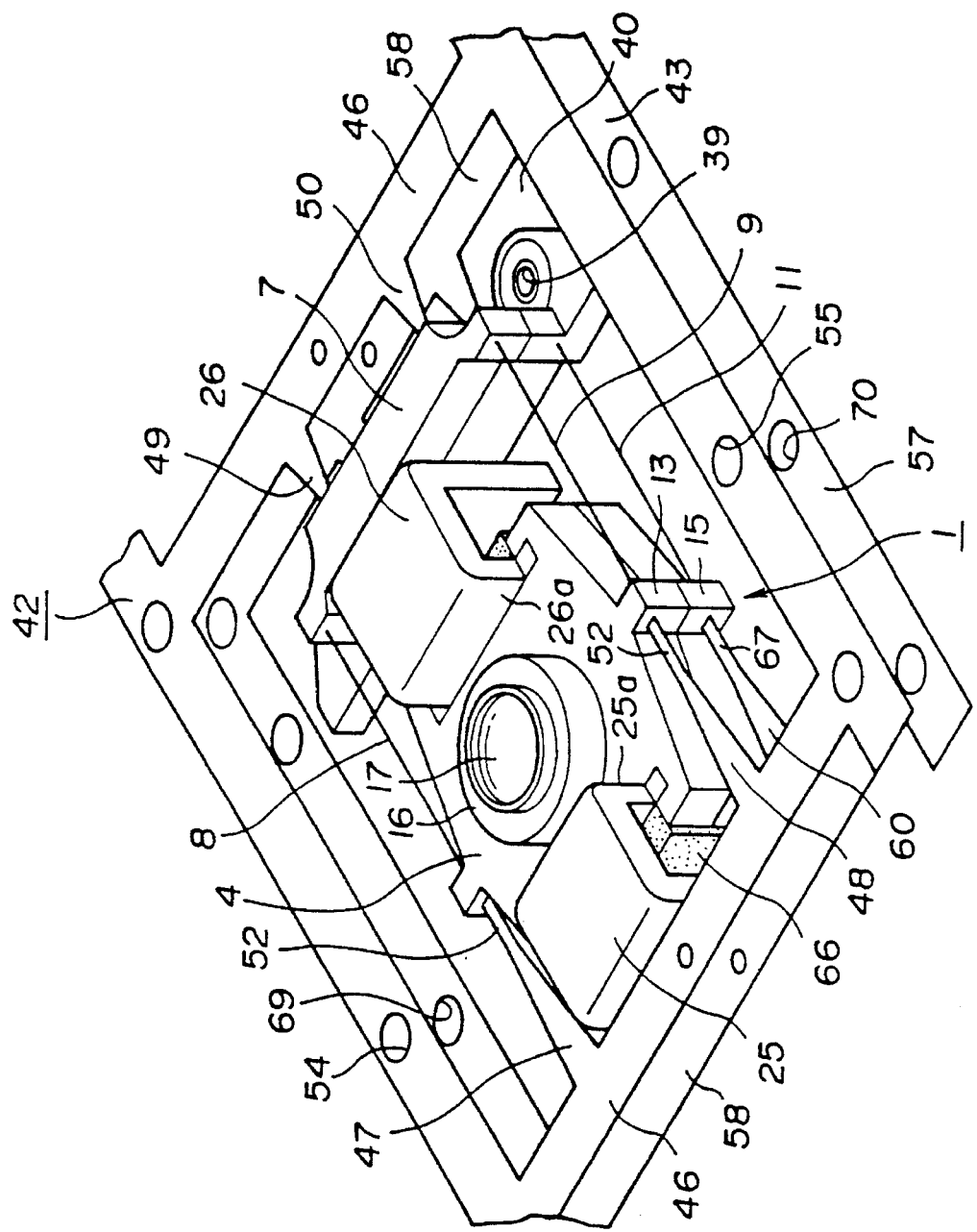
FIG. 22 is an enlarged partial perspective view showing the state in which an object lens and a yoke are adjust attached to the object lens holder previously joined to the upper and the lower reed frames.

In each of the object lens holders 1, interconnected by the upper reed frame 42 and the lower reed frame 43, an object lens holder 16, holding an object lens 17, is fitted via the lens mounting recess 18 formed in the upper bobbin half 2, while the first and second yokes 25, 26 are attached by means of the engaging recesses 23, 24 and engaging recesses 33, 34 formed continuously in the upper and lower bobbin halves 2 and 3, as shown in FIGS. 21 and 22.

Meanwhile, the first and the second yokes 25, 26 may also be attached in position after the object lens holder 1 is severed from the upper reed frame 42 and the lower reed frame 43, as will be explained subsequently.

The object lens holders 1, interconnected by the upper reed frame 42 and the lower reed frame 43, and carrying the first and the second yokes 25, 26, as shown in FIG. 19, are severed from the upper reed frame 42 and the lower reed frame 43, for producing a single object lens holder 1, as shown in FIG. 6.

To this end, the weakened portion 52 at the narrow width distal end parts of the base pieces 47, 48 for the upper bobbin half and the weakened portion 53 at the distal ends of the base pieces 49, 50 for the upper holder half are cut along the upper bobbin half 2 and the upper holder half 5. Similarly, the weakened portion 67 at the narrow width distal ends of the base pieces 59, 60 and the weakened portion 68 at the narrow width distal ends of the base pieces 61, 62 for the lower bobbin half are cut along the lower bobbin half 3 and the lower holder half 6 by a cutter provided in e.g. the automatic assembly machine.

Figure 23:
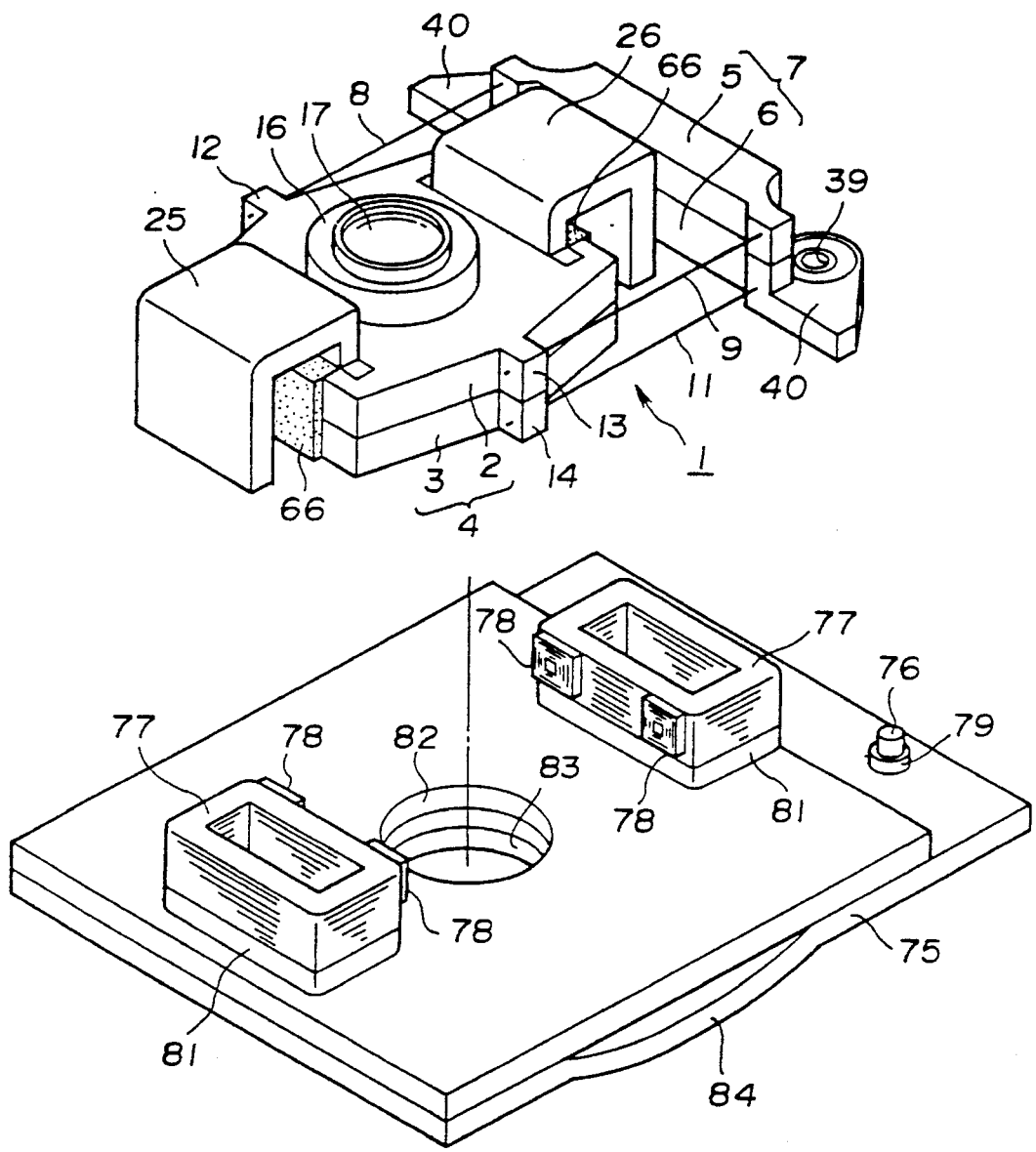
FIG. 23 is an exploded perspective view showing the state in which an object lens holder according to the present invention is about to be assembled to and supported by a supporting base plate making up an object lens driving unit.
Figure 24:
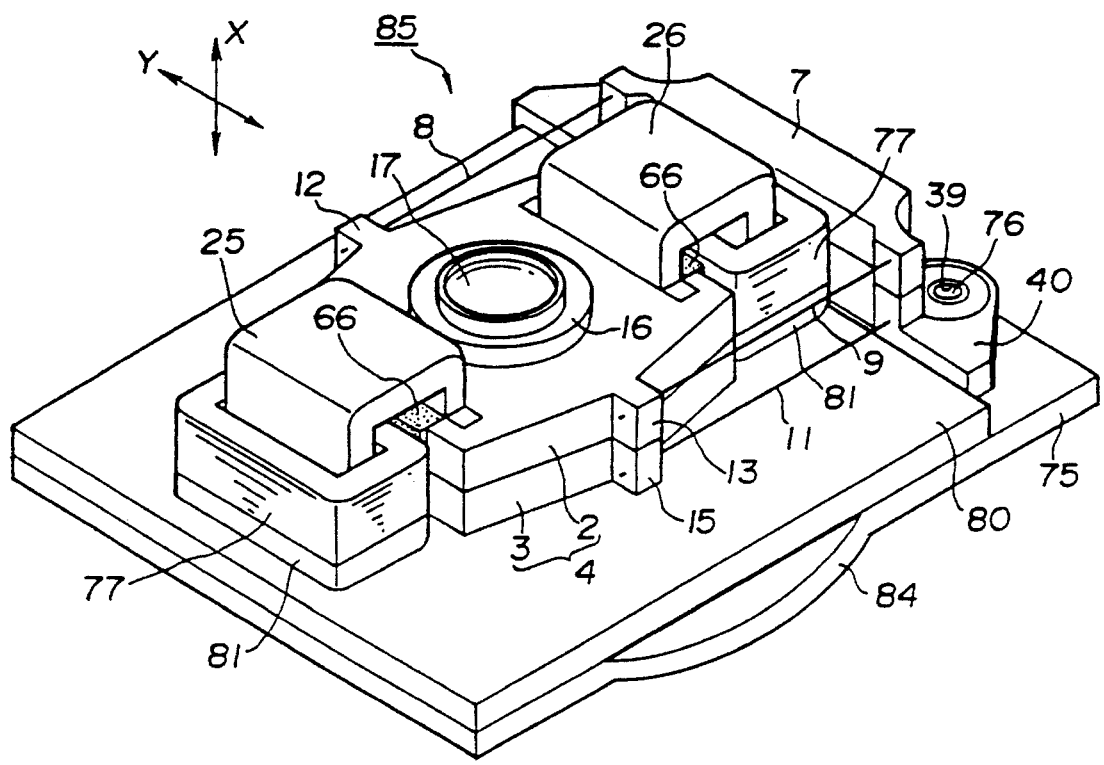
FIG. 24 is a perspective view showing an object lens driving unit including the object lens holder of the present invention as a component.

The object lens holder 1, produced and assembled as described above, constitutes an object lens driving device for displacing the object lens 17 mounted on the bobbin part 4 in a direction along the optical axis of the object lens 1 and in the direction normal thereto along with the bobbin part 4. Referring to FIGS. 23, 24, the above-described object lens holder 1 is supported on a supporting base plate 75 for constituting an object lens driving device. To this end, focusing controlling coils 77, 77, making up a focusing controller for displacing the object lens 17 in the focusing direction along the optical axis of the object lens by the first and second yokes 25, 26 mounted on the object lens holder 1 and the permanent magnets 66, 66 connected to these yokes 25, 26, and tracking controlling coils 78, 78, making up a tracking controller for displacing the object lens 17 in the direction normal to the optical axis of the object lens 17 or in the radial direction of the disc by the first and second yokes 25, 26 mounted on the object lens holder 1 and the permanent magnets 66, 66 connected to these yokes 25, 26, are provided on the supporting base plate 75.

The supporting base plate 75, supporting the object lens holder 1, is used simultaneously as a mounting base for mounting on an optical block housing optical components or the semiconductor laser as a laser light source, and is fabricated by machining a metal sheet. On a lateral side of the supporting base plate 75, two positioning pins 76 are set in juxtaposition for supporting the object lens holder 1 by means of the holder part 7.

The object lens holder 1 is mounted and supported on the supporting base plate 75, as shown in FIG. 21, by introducing the supporting pins 76, 76 into the through-holes 39, 39 of the supporting projections 40, 40 integrally formed with the holder part 7. That is, the object lens holder is supported on the supporting base plate 75, with the holder part 7 as a stationary supporting part, so that the bobbin part 4, supported with respect to the holder part 7 by the first to fourth resilient deflecting members 8 to 11, is supported on the supporting base plate 75 in a cantilevered manner with the side of the holder 7 as a fixed part.

Referring to FIG. 23, the proximal ends of the supporting pins 76, 76, adapted for supporting the holder part 7, are formed with stepped parts 79, 79 for controlling the mounting height of the object lens holder 1 relative to the supporting base plate 75. The object lens holder 1 has the supporting projections 40, 40 of the holder part 7 set on the stepped parts 79, 79 so as to be controlled as to the mounting height thereof with respect to the supporting base plate 75.

Figure 25:
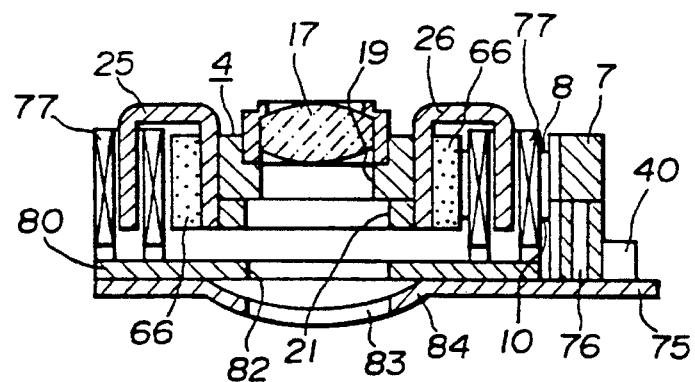
FIG. 25 is a cross-sectional side view showing an object lens driving unit including the object lens holder of the present invention as a component.

Since the object lens holder 1 is supported in this manner with the mounting height position relative to the supporting base plate 75 controlled by means of the holder part 7, and the lower holder half 6 constituting the holder part 7 has a height $H_2$ larger than the height $H_1$ of the lower bobbin half 3 constituting the bobbin part 4, as mentioned previously, the bobbin part 4, supported by the holder part 7 by the first to fourth resilient deflecting members 8 to 11, is spaced apart from the supporting base plate 75 a predetermined distance from the supporting base plate 75, as shown in FIG. 25. That is, when assembled as a portion of the object lens driving device and adapted for being displaced in the direction along the optical axis of the object lens 17, or in the focusing direction, the bobbin part 4 is supported at a distance from the supporting base plate 75 which will permit, the bobbin part to be moved along the optical axis without being contacted with the supporting base plate 75.

The focusing controlling coils 77, 77, constituting the focusing controller, is wound in a rectangular form, and is supported on the supporting base plate 75 by means of a printed circuit, board 80 which is joined to a mounting surface of the object, lens holder 1 of the supporting base plate 75 such as with an adhesive. That is, the focusing controlling coils 77, 77 are wound on the upper sides of rectangular coil bobbins 81, the base sides of which are secured to the printed circuit board 80. The tracking controlling coils 78, 78, constituting the tracking controller, are wound in a flat rectangle, and arranged in juxtaposition to the facing surfaces of the focusing controlling coils 77, 77. The ends of the coils 77, 77 and 78, 78 are soldered to a wiring pattern 80a in the printed circuit board 80 supplied with focusing and tracking controlling currents.

When the object, lens holder 1 is mounted on the supporting base plate 75, on which the focusing controlling coils 77, 77 and the tracking controlling coils 78, 78 are arranged, the arms 25b, 26b of the first, and second yokes 25, 26 mounted on the bobbin part 4 are introduced into the tubular focusing controlling coils 77, 77, as shown in FIGS.24 and 25. These focusing controlling coils 77, 77 are interposed between the first and second yokes 25, 26 each of a U-shaped cross-section and faced by the permanent magnets 66, 66 secured to the arms 25a, 26a of these yokes 25, 26 for constituting the focusing controlling driving section for driving and shifting the object lens 17 in the direction along the optical axis thereof, that is in the focusing direction.

The tracking controlling coils 78, 78, secured to the focusing controlling coils 77, 77, are interposed between the first and the second yokes 25, 26 and faced by the permanent magnets 66, 66 for constituting the tracking controlling driving section for driving and shifting the object lens 17 radially of the disc or in the tracking direction.

By supporting the object lens holder 1 by means of the holder part 7 on the supporting base plate 75 on which the focusing controlling coils 77, 77 and the tracking controlling coils 78, 78 are arranged, as described above, an object lens driving unit 85 as shown in FIGS. 24 and 25 is provided, which includes the focusing controlling driving section for displacing the object lens 17 in the focusing direction along the optical axis of the lens and the tracking controlling driving section for displacing the object lens 17 radially of the disc, that is in the direction normal to the optical axis of the lens 17.

When the focusing controlling current is supplied to the focusing controlling coils 77, 77 constituting the focusing controlling driving section, the object lens driving unit 85 generates a driving force of driving the object lens 17 in the focusing direction along the lens optical axis. The object lens 17 is shifted in this manner along its optical axis, shown by arrow X in FIG. 24, while resiliently deflecting the first to fourth resilient deflecting members 8 to 11. When the tracking controlling current is supplied to the tracking controlling coils 78, 78 constituting the tracking controlling driving section, the object lens driving unit 85 generates a driving force of driving the object lens 17 in the tracking direction normal to the lens optical axis. The object lens 17 is shifted in this manner in the direction normal to its optical axis, shown by arrow Y in FIG. 24, while resiliently deflecting the first to fourth resilient deflecting members 8 to 11.

Referring to FIG. 23, the supporting base plate 75 supporting the object lens holder 1 and the printed wiring board 80 provided on the supporting base plate 75 are formed with through-holes 82, 83 for transmitting the laser light radiated from the laser light source to the object lens 17.

Figure 26:
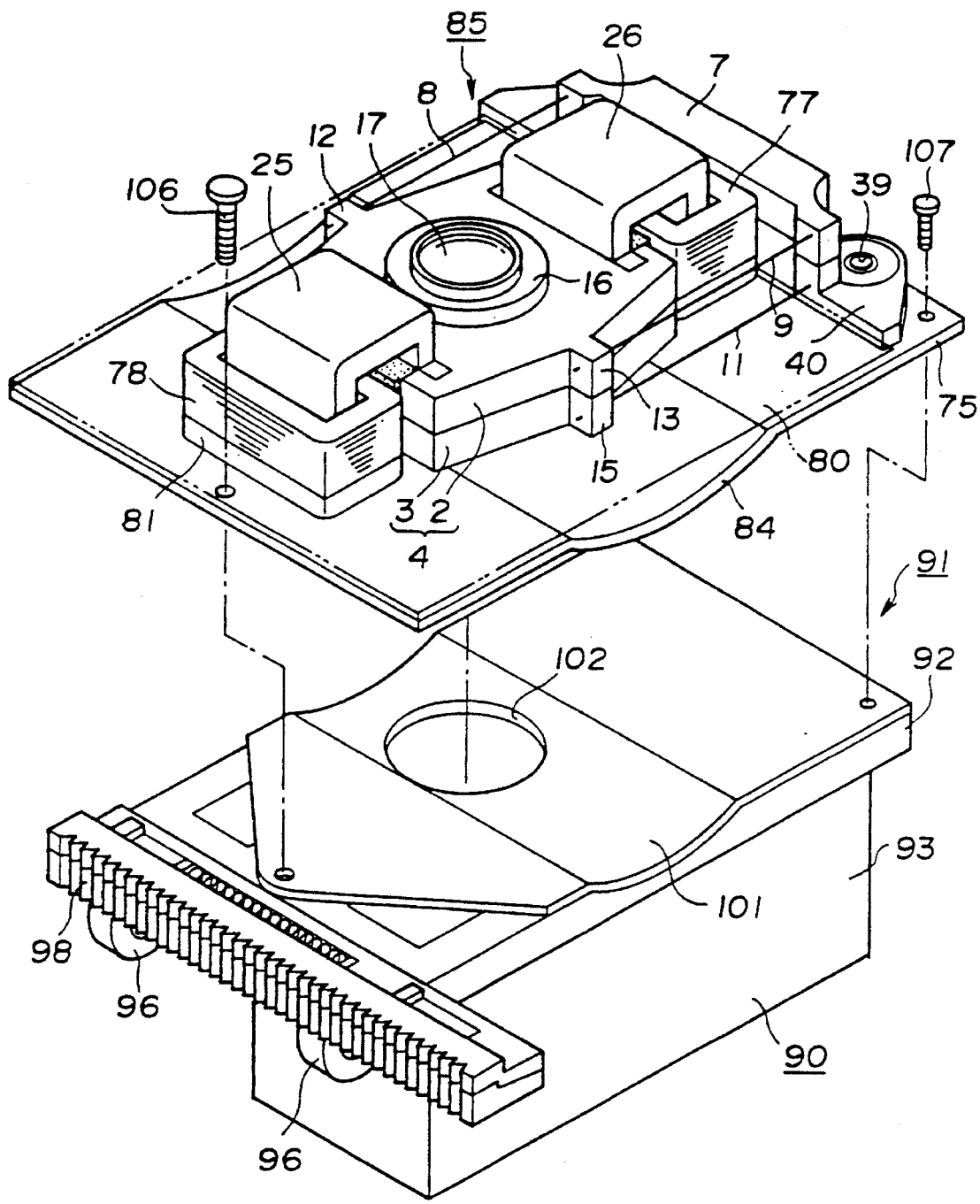
FIG. 26 is an exploded perspective view showing an optical head including an object lens driving unit in turn including an object lens holder according to the present invention.
Figure 27:
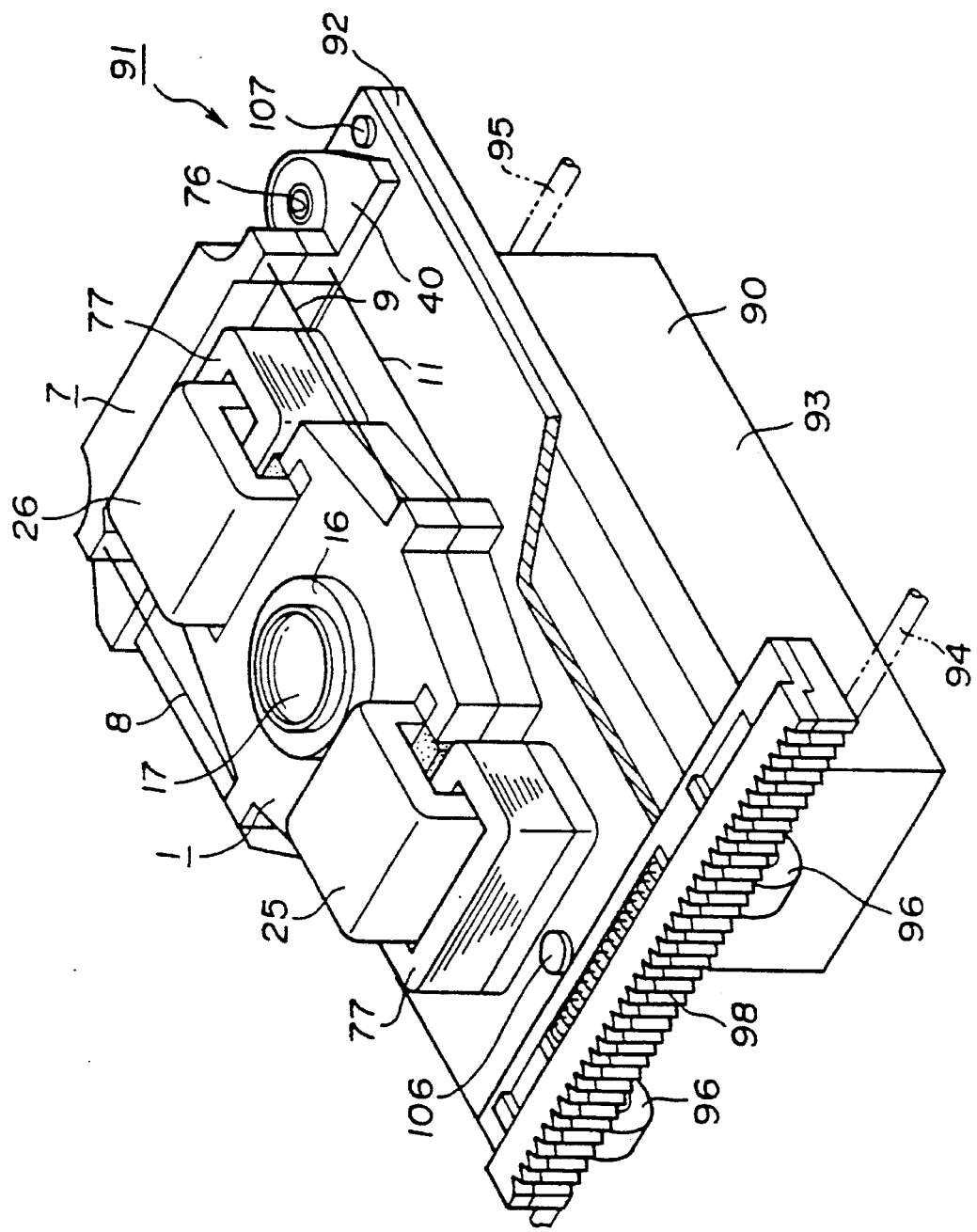
FIG. 27 is a perspective view showing an optical head including an object lens driving unit in turn including an object lens holder according to the present invention.

The object lens driving device 85, prepared as described above, constitutes an optical head which is mounted on the optical block and which is used for recording information signals on an optical disc or reproducing the information signals recorded on the optical disc. When the object lens driving device 85 is constituted in this manner as the optical head, a skew-adjusting mechanism, which is used for adjusting the optical axis of the laser light for causing the laser light radiated via the object lens 17 on the optical disc surface to be incident perpendicularly on the optical disc surface, is provided on the optical head. For constituting the skew-adjusting mechanism, the supporting base plate 75 is provided with an expanded skew seat 84 abutted and supported by an offset rest seat 101 provided on the optical block. That is, as shown in FIGS. 24 and 26, the object lens driving device 85 is mounted on the optical block 90 by means of the supporting base plate 75 provided with the skew seat 84 for constituting an optical head 91.

Meanwhile, the optical block 90, constituting the optical head 91, is made up of a movable base member 92, fitted with the object lens driving device 85, and a laser light generating detecting unit 93, secured to the lower surface of the movable base member 92. The optical head 91 is moved radially of the optical disc, by being guided by a slide position reference guide member 94 and a guide 95, provided within the recording/reproducing apparatus having the optical disc as a recording medium, for recording and/or reproducing the information signals on or from the optical disc. To this end, the movable base member 92 is provided with a slide bearing 96 for supporting the sliding position reference guide member 94 in the shape of a shaft and a sliding support 97 engaged with the guide member 95, while also being provided with a rack 98. The movable base member 92 has the rack 98 engaged with a pinion of a rack-pinion driving unit provided within the recording/reproducing apparatus. The optical head 91 is moved radially of the optical disc under the driving power of the rack-pinion driving unit.

The laser light generating and detecting unit 93, mounted on the lower surface of the movable base member 92, houses a number of optical components, such as a semiconductor laser 100 as a laser light source, a diffraction grating for separating the laser light radiated from the semiconductor laser 100 into three laser light beams, a polarization light beam splitter for transmitting the laser light radiated from the semiconductor laser 100 towards the optical disc and separating the return light from the optical disc, a collimator lens for collimating the laser light radiated from the semiconductor laser 100 and a photodetector for detecting the light reflected from the optical disc and separated and reflected by the polarization light beam splitter.

Figure 28:
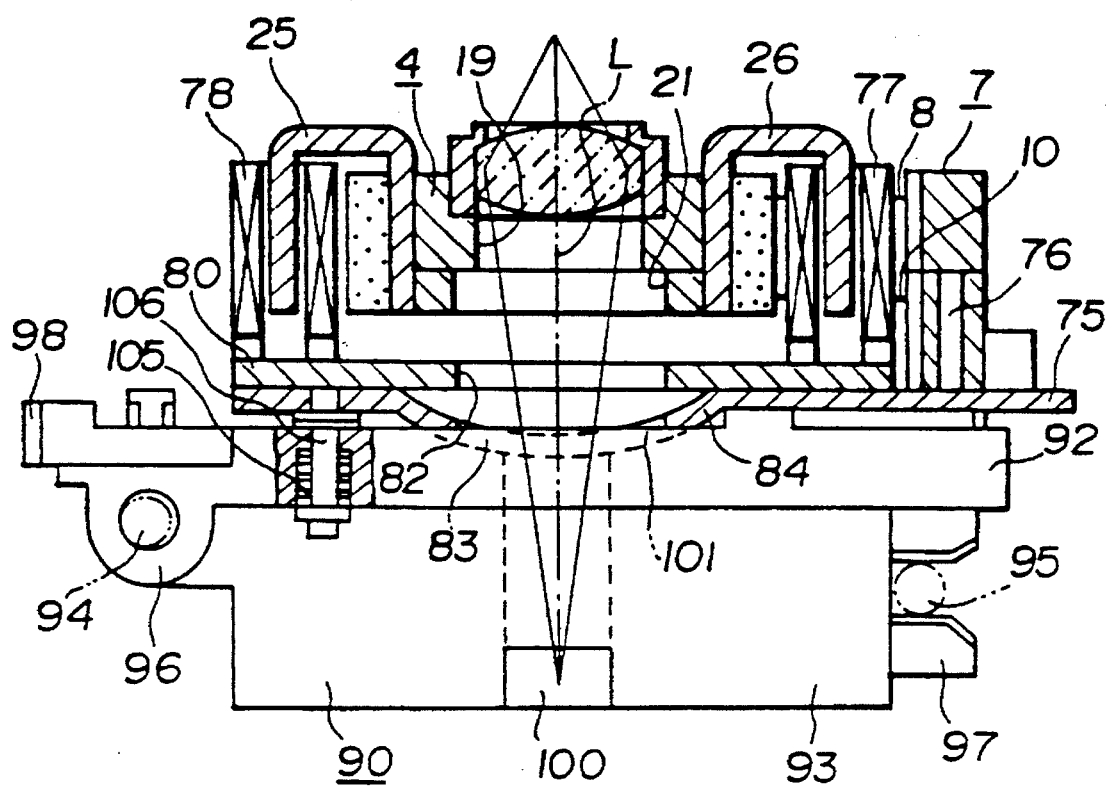
FIG. 28 is a schematic cross-sectional side view showing an optical head including an object lens driving unit in turn including an object lens holder according to the present invention.

Referring to FIG. 28, the object lens driving device 85 is attached to the optical block 90 by having the skew seat 84 abutted and supported on the recessed rest seat 101 formed on the upper surface of the movable base member 92 of the optical block 90 for supporting the supporting base plate 75 by the movable base member 92, and constitutes the optical head 91 in conjunction with the above-mentioned optical block 90.

Meanwhile, the supporting base plate 75 is supported on the movable base member 92 by means of a skew-adjusting screw 106, wound with an intermediate coil spring 105, and a set screw 107. By rotating the skew-adjusting screw 106, the supporting angle of the supporting base plate 75 with respect to the movable base member 92 is adjusted by means of the skew seat 84 for adjusting the tilt of the optical axis L of the laser light radiated on the optical disc surface by means of the object lens 17. In this manner, the laser light may be adjusted so as to be incident accurately perpendicularly to the optical disc surface without tilt.

The rest seat 101 of the movable base member 92 is formed with a light window 102 for transmitting the laser light radiated from the semiconductor laser 100 towards the object lens 17 and for transmitting the return light reflected from the optical disc so as to be incident on the optical lens 17 into the optical block 90.

SECOND EMBODIMENT

Meanwhile, in the block of the upper object lens holding members 71 and the block of the lower object lens holding blocks 72 of the preceding first embodiment, shown in FIGS. 15 and 16, the associated upper bobbin half 2 and upper holder half 5 are arrayed in the longitudinal direction of the upper reed frame 42, while the associated lower bobbin half 3 and lower holder half 6 are arrayed in the longitudinal direction of the lower reed frame 42. However, the arraying direction of the upper bobbin half 2 and the upper holder half 5 and that of the lower bobbin half 3 and the lower holder half 6 are not limited to those shown in FIGS. 15 and 16.

Figure 30:
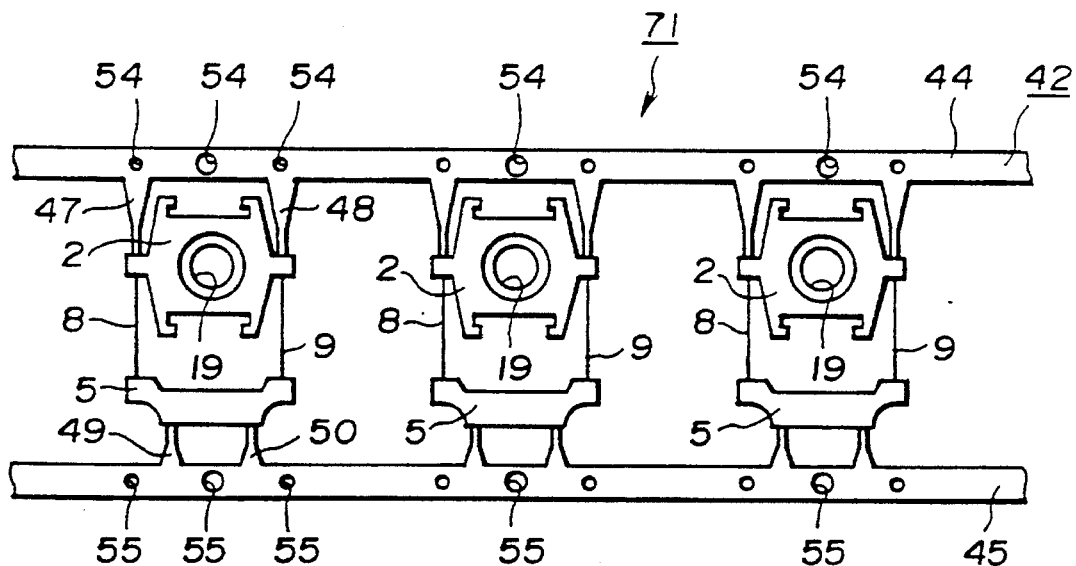
FIG. 30 is a plan view showing a modification of an upper object lens holding block member prepared by molding the upper bobbin half and the upper holder half to the upper reed frame.
Figure 32:
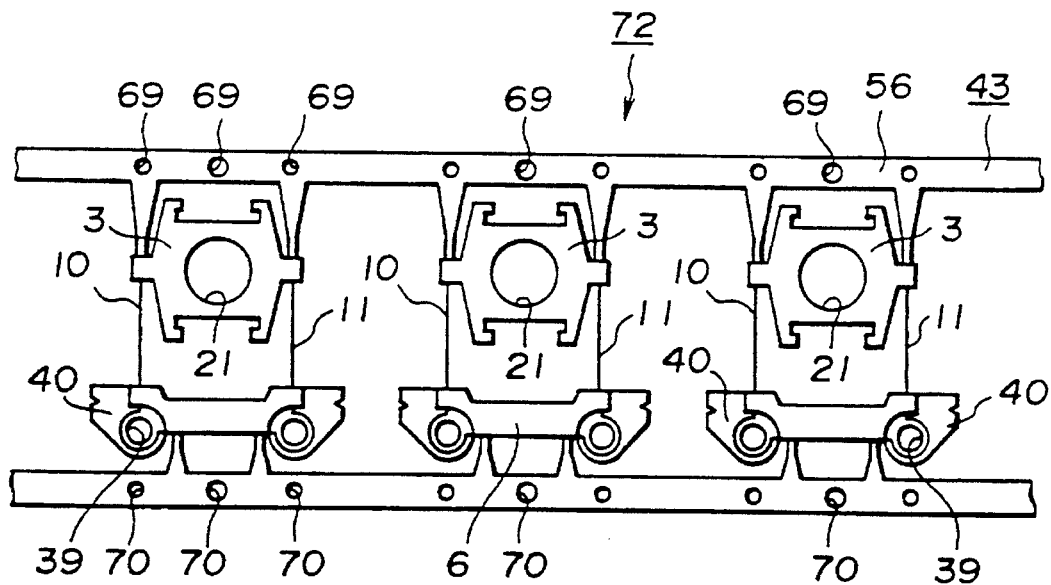
FIG. 32 is a plan view showing a modification of a lower object lens holder block prepared by molding the lower bobbin half and the lower holder half to the lower reed frame.

That is, the associated upper bobbin half 2 and upper holder half 5 and the associated lower bobbin half 3 and lower holder half 5 may be arrayed in a direction normal to the longitudinal direction of the upper reed frame 42 and the lower reed frame 43, that is along the width of the reed frames 42 and 43, as shown in FIGS. 30 and 32.

Figure 29:
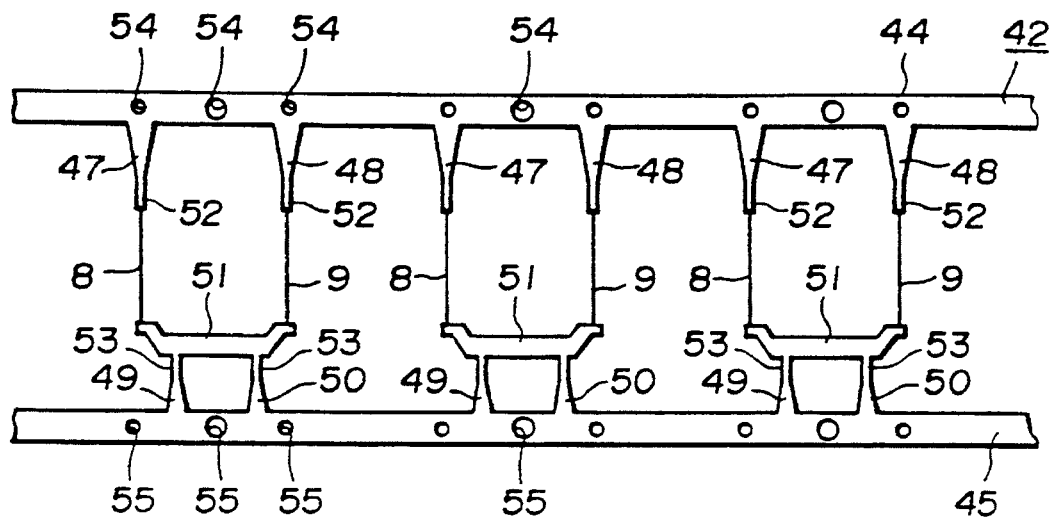
FIG. 29 is a plan view showing a modification of the upper reed frame formed by punching a thin sheet member.

With the upper reed frame 42 of the block of the upper object lens holders 71 having the upper bobbin halves 2 and the upper holder halves 5 arrayed as shown in FIG. 30, the base pieces 47, 48 for the upper bobbin halves and the base pieces 49, 50 for the lower bobbin halves are integrally extended from the opposite sides of the first and second strip-shaped portions 44, 45 of the upper reed frame 42, as shown in FIG. 29. That is, these base pieces are directly extended from the first and second strip-like portions 44, 45 without providing connecting pieces 46 spanning the strip-like portions 44, 45. Synthetic resin is injected through the base pieces 47, 48 for the upper holder halves and through the base pieces 49, 50 for the lower holder halves, so that, as shown in FIG. 30, the upper bobbin halves 2 and the upper holder halves 5 are molded as one with these bases pieces 47, 48 for the upper bobbin halves and with the base pieces 49, 50 for the upper holder halves.

Figure 31:
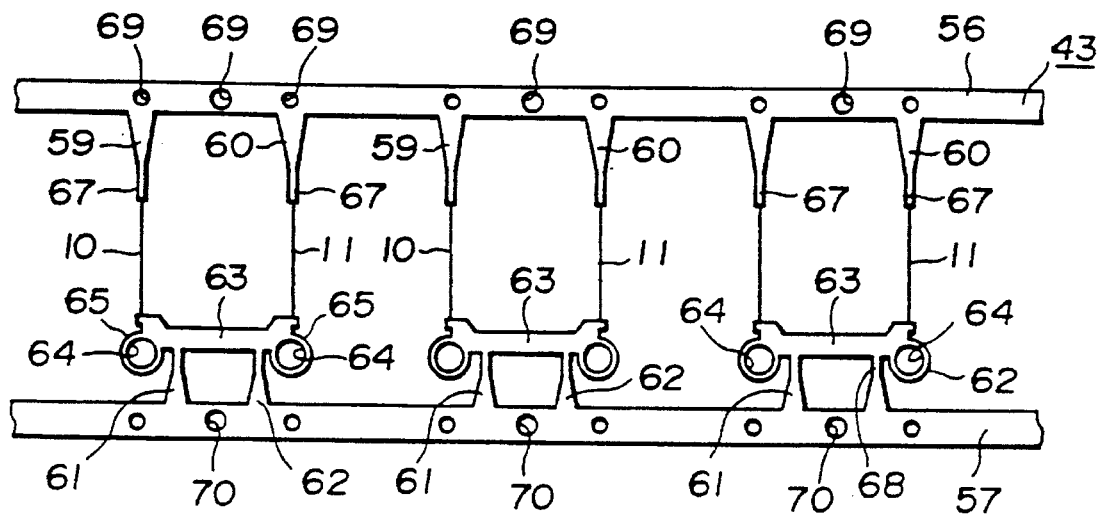
FIG. 31 is a plan view showing a modification of a lower reed frame produced by punching the thin sheet member.

With the upper reed frame 43 of the block of the upper object lens holders 72 having the lower bobbin halves 3 and the lower holder halves 6 arrayed as shown in FIG. 32, the base pieces 59, 60 for the lower bobbin halves and the base pieces 61, 62 for the lower holder halves are integrally extended from the opposite sides of the first and second strip-shaped portions 56, 57 of the lower reed frame 43, as shown in FIG. 31, similarly to the upper reed frame 42 shown in FIG. 29. That is, these base pieces are directly extended from the first and second strip-like portions 56, 57 without providing connecting pieces 58 spanning the strip-like portions 56, 57. Synthetic resin is injected through the base pieces 59, 60 for the lower bobbin halves and through the base pieces 61, 62 for the lower holder halves, so that, as shown in FIG. 32, the lower bobbin halves 3 and the lower holder halves 6 are molded as one with these bases pieces 59, 60 for the lower bobbin halves and the base pieces 61, 62 for the upper holder halves.

Since the arraying directions of the associated upper bobbin halves 2 and upper holder halves 5 and that of the associated lower bobbin halves 3 and lower holder halves 6 on completion of the block of the upper object lens holding members 71 and the block of the lower object lens holding members 72 differ from those of the preceding embodiment, as shown in FIGS. 30 and 32, the assembly guide holes 54, 55 formed in the first and second strip-shaped portions 44, 45 of the upper reed frame 42 and the assembly guide holes 69, 70 formed in the first and second strip-shaped portions 56, 57 of the lower reed frame 43 for alignment differ in their positions from those of the preceding embodiment. That is, the guide holes 54, 55 are formed on a centerline of the upper and lower bobbin halves 2 and 3, while the guide holes 69, 70 are formed on a line of extension of the first to fourth resilient deflecting members 8 to 11, as shown in FIGS. 30 and 32. These guide holes 54, 55 and 69, 70 differ in diameters depending on their positions to permit identification thereof at the time of assembling by an automatic system to enable position matching of the upper and lower bobbin halves 2, 3 and the upper and lower holder halves 5, 6 to be abutted to each other.

Since only the arraying directions of the associated upper bobbin and holder halves and the associated lower bobbin and holder halves differ in the blocks 71 and 72 shown in FIGS. 30 and 32 from those of the preceding embodiment while the aligning and other precess steps for forming the object lens holder 1 are the same as those described in connection with the preceding embodiment, the same parts are indicated by the same reference numerals and the corresponding description omitted for clarity.

THIRD EMBODIMENT

In the preceding embodiments, since the alignment and connection operation of the upper and lower bobbin halves 2 and 3 for formation of the lens holder 1 is performed while these halves remain joined to the upper and lower reed frames 42, 43, the upper and lower reed frames 42 and 43 may play the role of position-matching the upper and the lower bobbin halves 2 and 3 about their axes of rotation. The result is that the alignment and connecting positions of the upper and lower bobbin halves 2 and 3 about their axes of rotation may be fixed only by engaging one of the positioning projection 22 in the associated one of the positioning through-holes 21.

However, if the upper bobbin halves 2 and the lower bobbin halves 3 are separated from the upper reed frame 42 and the lower reed frame 43 and aligned and connected to each other in such isolated condition, the position matching about the axis of rotation cannot be achieved by solely engaging one of the positioning projections 22 in the associated positioning through-hole 21.

Figure 33:
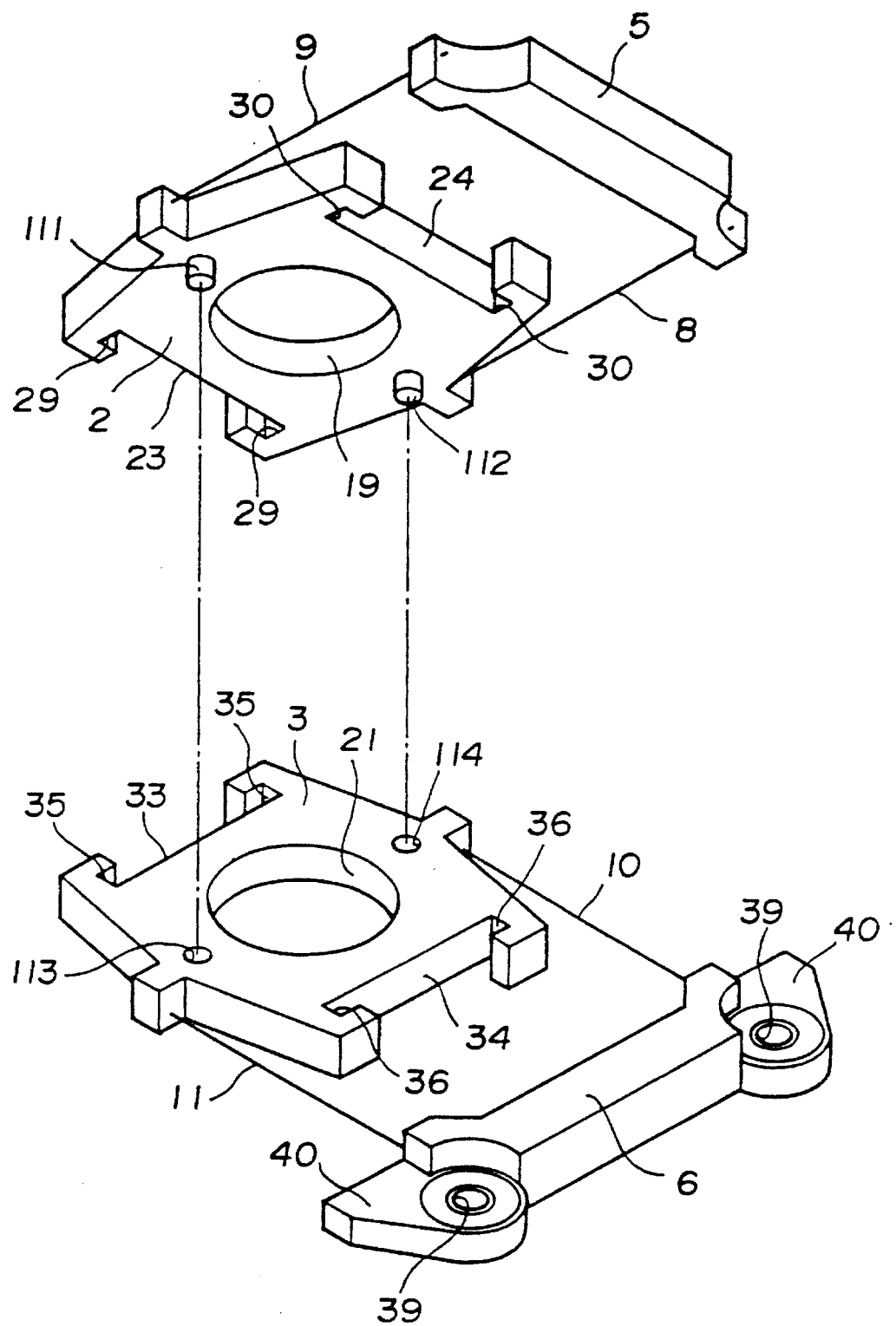
FIG. 33 is a exploded perspective view showing a modification of an object lens holder.
Figure 34:
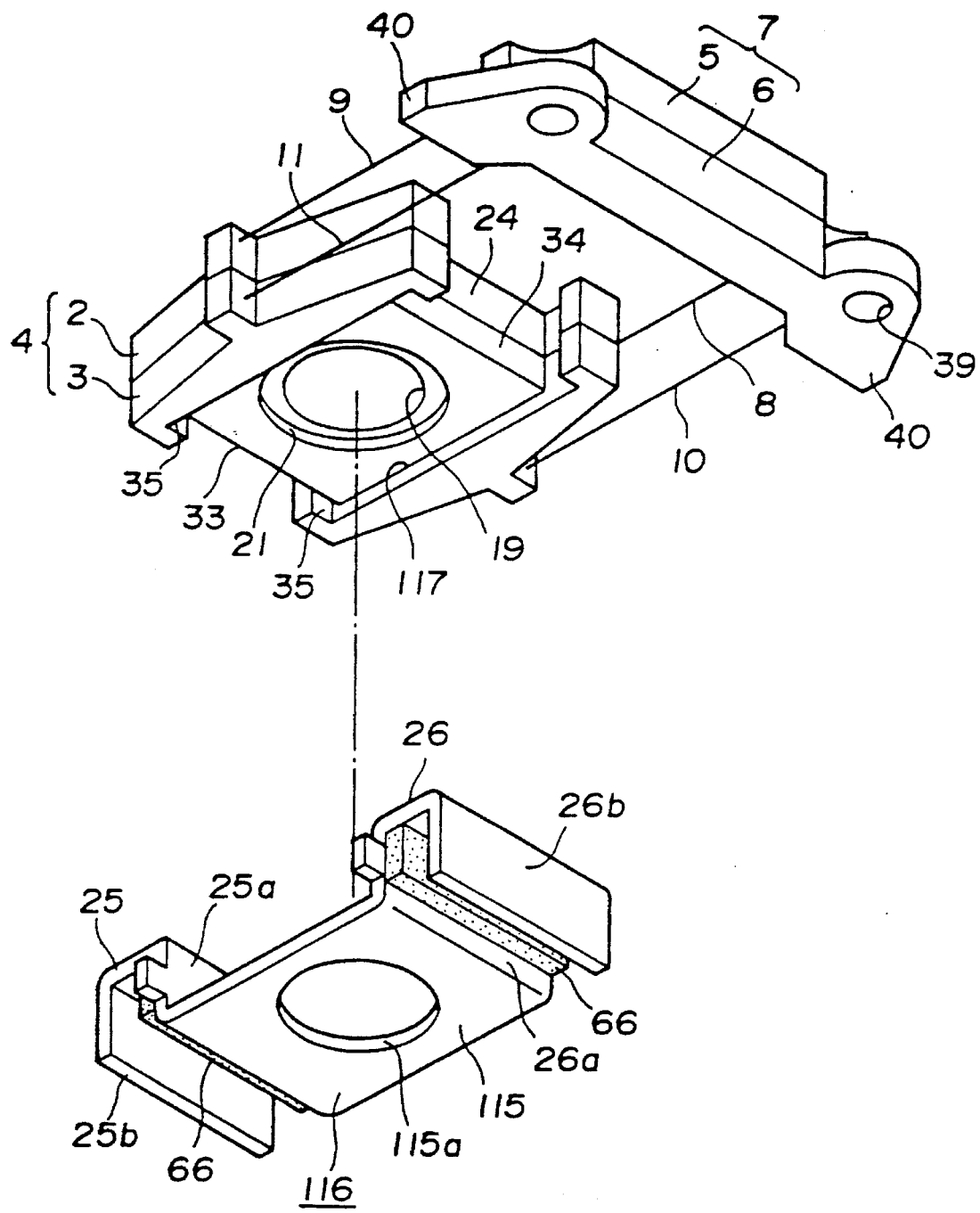
FIG. 34 is a perspective view, as seen from below, showing the state of assembling a modification of the object lens holder of the present invention employing a unitary type yoke.
Figure 35:
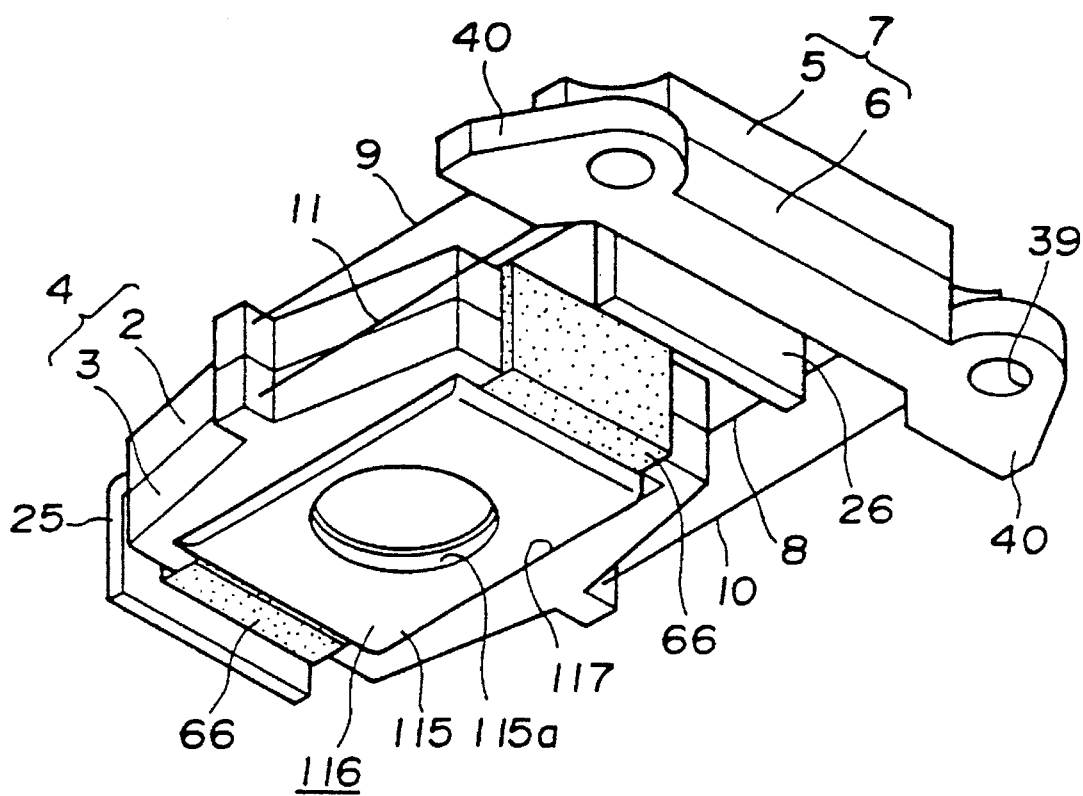
FIG. 35 is a perspective view showing the state in which the unitary type yoke is just attached to the object lens holder.

In this consideration, a lower abutting and connecting surface 20 of the upper bobbin half 2 is formed with a pair of engaging 111, 112 symmetrically with respect to the laser light transmitting through-hole 19, as shown in FIG. 33, while an abutting and connecting surface 32 of the lower bobbin half 3 is formed with a pair of engaging recesses 113, 114 for being engaged with the engaging pins 111, 112. By engaging the pins 111, 112 in these engaging recesses 113, 114, the upper and the lower bobbin halves 2 and 3 may be engaged with each other for achieving the position matching about the axes of rotation without the necessity of relying upon the upper and lower reed frames.

FOURTH EMBODIMENT

In the preceding embodiments, the first and second yokes 25, 26 to be mounted on the object lens holder 1 are separate members. Alternatively, a one-piece yoke 116 may be employed, in which the ends of one of the arms 25a, 26a of the first and second yokes 25, 26 are connected to each other by a connecting piece 115. If the one-piece yoke 116 is used, an engaging recess 117 is formed on the lower surface of the lower bobbin half 3 for being engaged with the connecting piece 115. When fitting the one-piece yoke 116 on the object lens holder 1, the connecting piece 115 is engaged in the engaging recess 117.

By using such one-piece yoke 116, the number of the yokes to be fitted to the object lens holder 1 may be reduced for simplifying the yoke attachment operation while facilitating the management of the component parts. Since the one-piece yoke 116 is mounted on the object lens holder 1 by engaging the connecting piece 115 in the engaging recess 117, the object lens holder 1 is not increased in thickness by using the one-piece yoke 116.

Meanwhile, the connecting piece 115 of the one-piece yoke 116 is formed with a light window 115a for transmitting the laser light.

With the object lens holder 1 of the preceding embodiments, the permanent magnets 66, 66 are attached to the movable bobbin part 4 by means of the first and the second yokes 25, 26, so that, when the object lens driving device is completed, the driving part for driving the object lens 17 along its object lens 17 and in the direction normal thereto constitutes a so-called moving magnet type driving device in which the magnets 66, 66 are moved together with the bobbin part 4.

FIFTH AMENDMENT

The object lens holder 1 of the present invention is applied not only to the object lens driving device fitted with the moving magnet type driving part, but also to the object lens driving device fitted with the moving coil type object lens driving part in which the focusing controlling coils 77, 77 and the tracking controlling coils 78, 78 are mounted on the object lens holder 1 and in which the coils 77, 77, 78, 78 are displaced simultaneously with the bobbin part 4.

With the object lens holder 1 adapted to be applied to the moving coil type object lens driving device, the parts of the upper bobbin half 2 and the lower bobbin half 3 constituting the bobbin part 4 corresponding to the yoke-engaging recesses 23, 24, 33, 34 are formed as recessed coil-attaching sections 123, 124 engaged by one lateral sides of the rectangular focusing controlling coils 77, 77. The focusing controlling coils 77, 77 are arranged within the coil-attaching sections 123, 124. The tracking controlling coils 78, 78 are mounted on the opposite lateral sides facing the attachment sides of the focusing controlling coils 77, 77 to the coil attachment sections 123, 124.

Figure 36:
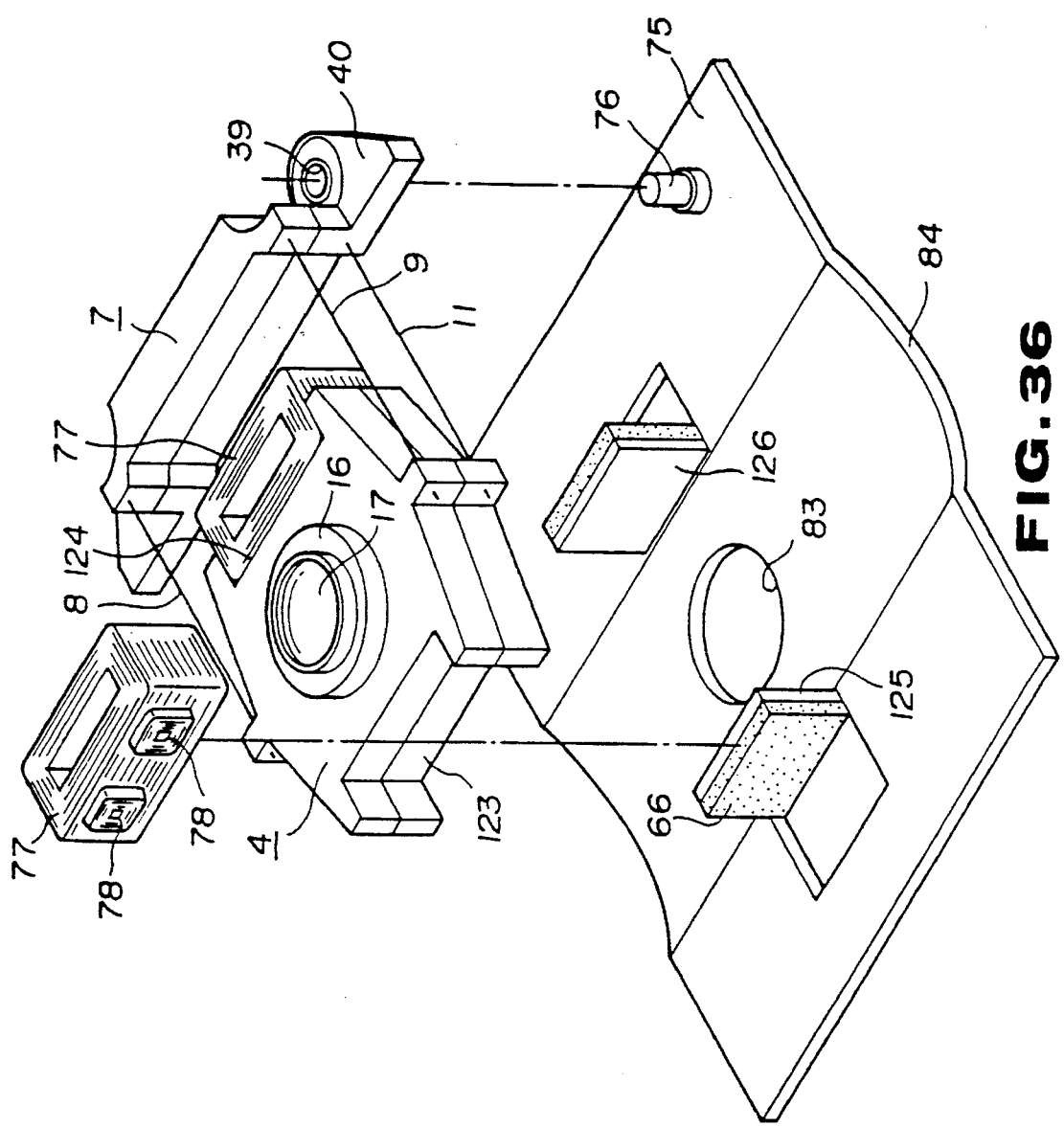
FIG. 36 is an exploded perspective view showing a moving coil type object lens driving unit constituted by attaching a focusing controlling coil and a tracking controlling coil to an object lens holder.
Figure 37:
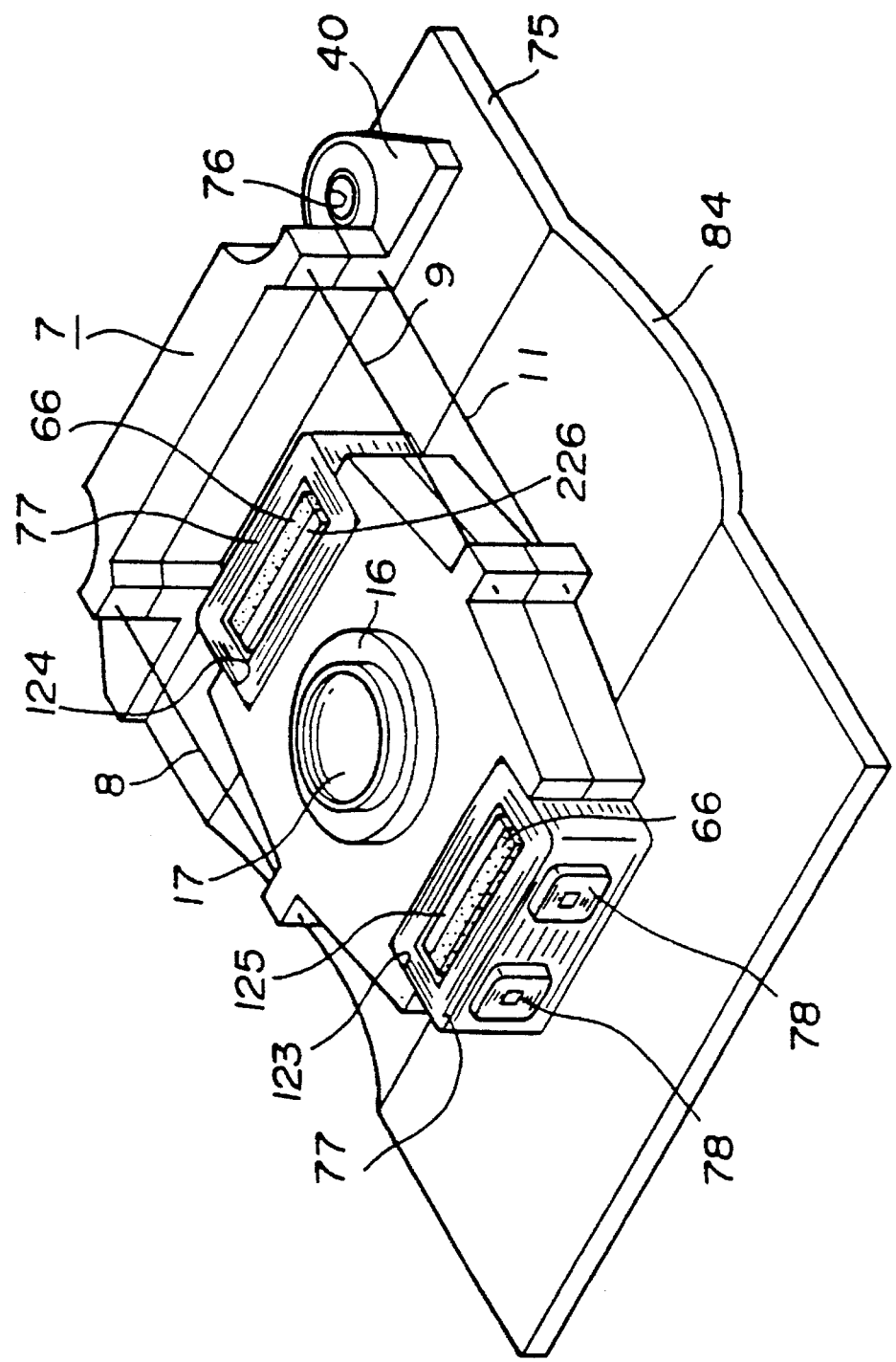
FIG. 37 is a perspective view showing a moving coil type object lens driving unit constituted by attaching a focusing controlling coil and a tracking controlling coil to an object lens holder.

With the moving coil type object lens driving device, the permanent magnets 66, 66 constituting the tracking controlling driving section for displacing the object lens 17 in the direction normal to the optical axis of the object lens 17 and the focusing controlling driving section for displacing the object lens 17 along the lens optical axis and mounted facing the focusing controlling coils 77, 77 and the tracking controlling coils 78, 78 are provided on an stationary part, that is, on the supporting base plate 75 supporting the object lens holder 1. That is, the magnets 66, 66 are joined to one lateral sides of yoke pieces 125, 126 formed by segmenting a apart of the supporting base plate 75, as shown in FIG. 36.

Figure 1:
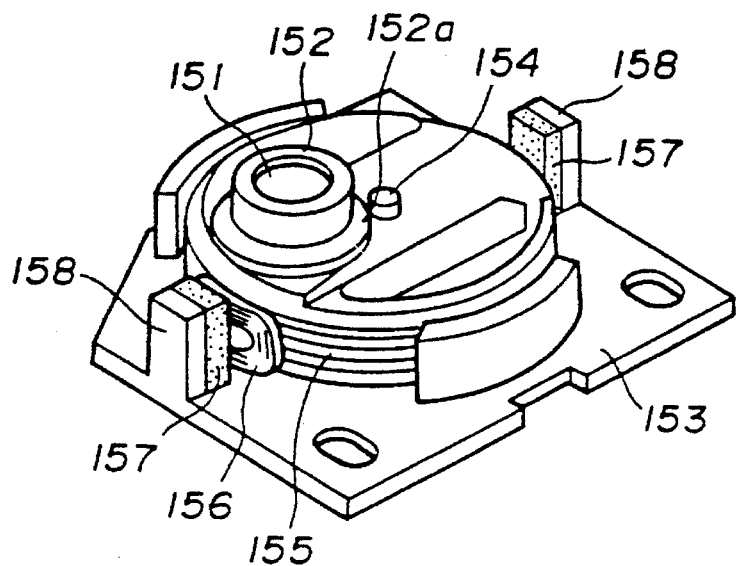
FIG. 1 is a perspective view showing a conventional axial sliding and rotating type object lens driving apparatus.
Figure 2:
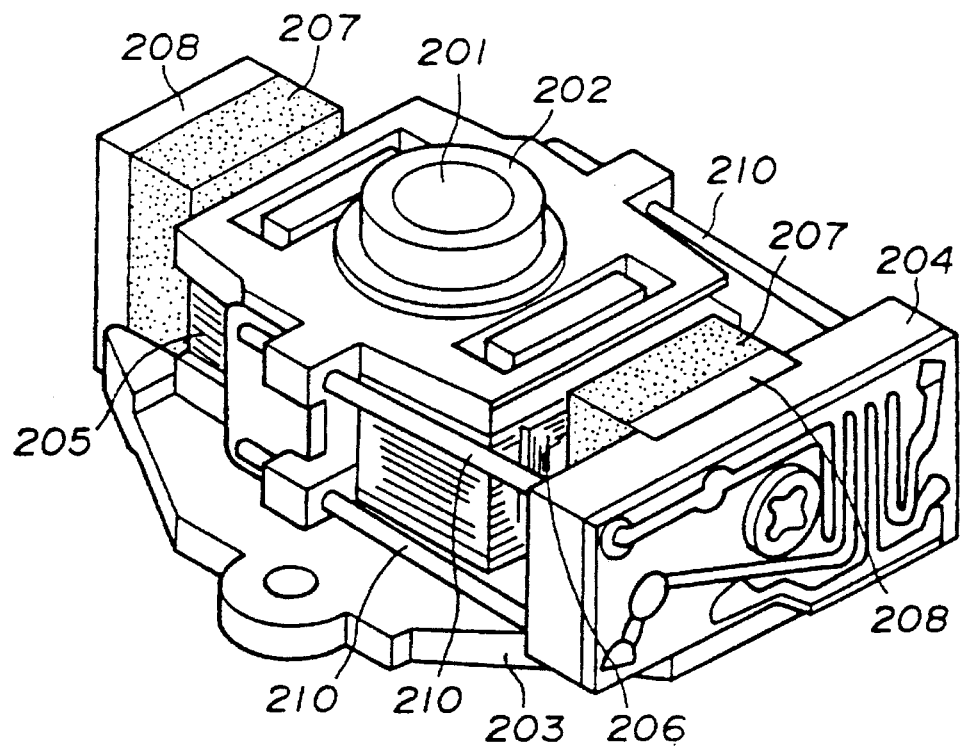
FIG. 2 is a perspective view showing a conventional wire-supported type object lens driving apparatus.
Figure 3:
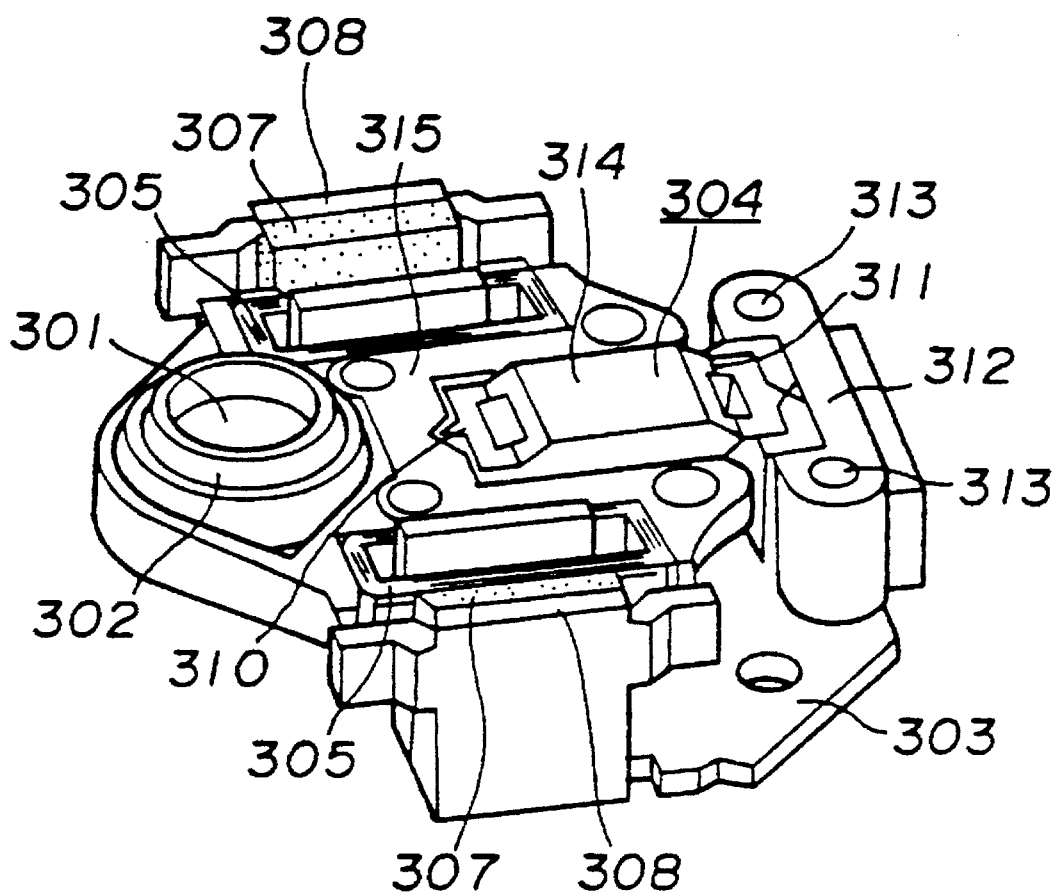
FIG. 3 is a perspective view showing a conventional molded hinge type object lens driving apparatus.

When the object lens holder 1 is supported by means of supporting pins 76, 76 set upright on the supporting base plate 75 as shown in FIG. 3, the magnets 66, 66 are fitted into the tubular focusing controlling coils 77, 77. The magnets 66, 66, thus fitted into the focusing controlling coils 77, 77, are faced by the focusing controlling coils 77, 77 and the tracking controlling coils 78, 78 for constituting the focusing controlling and tracking controlling driving sections.

With the above-described object lens driving device, focusing controlling signals may be supplied to the focusing controlling coils 77, 77 for focusing controlling for displacing the object lens 17 along its optical axis responsive to the focusing controlling signals supplied to the focusing controlling coils 77, 77. On the other hand, tracking controlling signals may be supplied to the tracking controlling coils 78, 78 for tracking controlling for displacing the object lens 17 in a direction normal to its optical axis responsive to the tracking focusing controlling signals supplied to the tracking controlling coils 78, 78.

The focusing and tracking controlling signals are supplied to the focusing controlling coils 77, 77 and the tracking controlling coils 78, 78 mounted on the movable object lens holder 1 by means of flexible tinsel cords attached to the object lens holder 1.

EMBODIMENT 6

Figure 38:
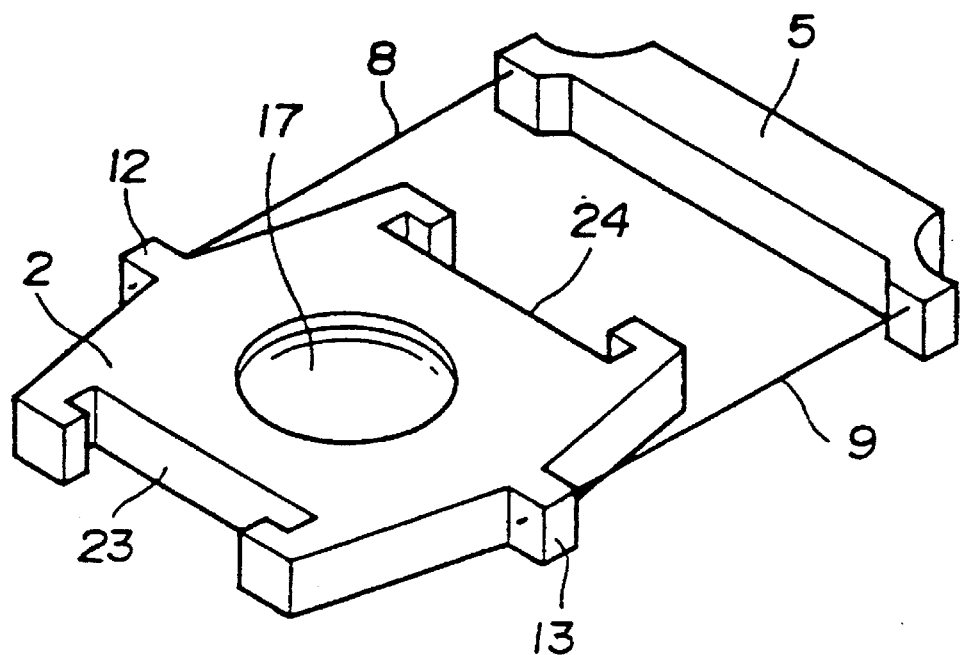
FIG. 38 is a perspective view showing an upper bobbin half formed as one with an object lens.
Figure 39:
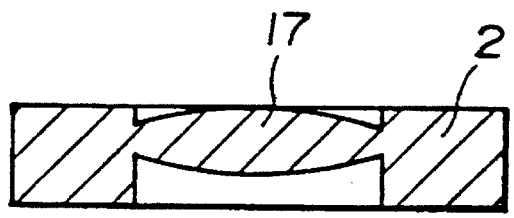
FIG. 39 is a cross-sectional side view showing a lower bobbin half formed as one with an object lens.

The object lens 17, attached to the object lens holder 1, is formed of glass, separately from the bobbin part 4 holding the object lens 17. For this reason, the object lens 17 is held by a lens-holding tube 16 and mounted on the bobbin part 4 by means of this lens-holding tube 16. However, the object lens 17 may be formed integrally with the upper bobbin half 2 of the bobbin part 4, as shown in FIGS. 38 and 39. If the object lens 17 is formed as one with the upper bobbin holder 2 in this manner, the operation of assembling the object lens 17 to the bobbin part 4 may be dispensed with for facilitating the assembling operation of the object lens holder 1.

Meanwhile, for forming the object lens 17 as one with the upper bobbin half 4, the object lens 17 and the upper bobbin half 2 are molded from synthetic resin. The object lens 17 and the upper bobbin half 2 may be formed of a synthetic resin having excellent optical properties, such as methacrylic resins.

The object lens 17 and the upper bobbin half 2 may be formed as one from different synthetic resin materials. For molding, a two-color molding method of injecting a synthetic resin material constituting the object lens 17 on the upper bobbin half 2 already formed of a synthetic resin different from the synthetic resin for the object lens 17. By using such two-color molding method, optimum materials for the object lens 17 and the upper bobbin half 2 may be selected. For example the object lens 17 may be molded from methacrylic resin having superior optical properties and the upper bobbin half 2 may be molded from PPS resins having excellent toughness.

With the above-described object lens holder of the present invention, constituted by aligning and connecting the first and the second bobbin halves provided with at least a pair of resilient deflecting members, the object lens holder may be fabricated by molding the synthetic resin to a thin sheet member formed with at least a pair of resilient deflecting members to form the first and the second bobbin halves, these bobbin halves being then aligned and connected to each other for forming the object lens holder. With the thus formed object lens holder, since the resilient deflecting members are integrally molded to the first and the second bobbin halves, the resilient deflecting members may be attached to the bobbin halves highly accurately. The object lens holder supported by the four resilient, deflecting members may be completed by aligning and connecting the first and second connecting members to each other.

For producing the object lens holder according to the present invention, synthetic resin is molded to the thin sheet, member formed with the resilient deflecting members for molding the first and the second bobbin halves which are aligned and connected to each other, and subsequently the first and second bobbin halves are severed from the thin sheet member for producing the object lens holder. In this manner, the thin sheet member may be used as assembly guides, and the process from the molding of the first and the second bobbin halves until the alignment and connection of the bobbin halves may be performed by means of an automatic machine to provide for automatic and efficient assembling and preparation of the object lens holders in larger quantities.

Besides, with the block of the object lens holding members according to the present invention, since the bobbin halves are integrally formed with the base sections integrally formed with one of the parallel strip-like portions, each formed with positioning holes and interconnected by plural connecting pieces, each pair of bobbin halves may be aligned and connected to each other with the aid of the positioning holes formed in the first and second strip-like portions, so that a large number of the object lens holders may be produced simultaneously to provide for efficient production of the object lens holders in larger quantities. The first and second strip-like portions, integrally molded with the bobbin halves, may be utilized as perforations engaged by feed pins of a feed unit of the automatic assembling machine, so that assembling by the automatic assembling machine may be achieved by accurately controlling the relative connecting positions of the bobbin halves. Also the bobbin halves may be aligned and connected to each other highly accurately for producing high precision object lens holders.

What is claimed is:

1. A method for producing an object lens holder for holding an object lens that converges a laser light radiated from a laser light source on a signal recording surface of an optical recording medium, comprising the steps of:

forming resilient deflecting portions in first and second thin sheet members, integrally molding first and second bobbin halves of synthetic resin on said first and second thin sheet members respectively, wherein said deflecting portions extend from portions of said bobbin halves, abutting and connecting said first and second bobbin halves to each other, and severing said first and second bobbin halves from said first and second thin sheet members together with said resilient deflecting portions.

2. A method as claimed in claim 1 wherein said first and second thin sheet members are each in the form of a thin strip about 0.2 mm in thickness and wherein said resilient deflecting portions are formed by punching said first and second thin sheet members.

3. A method as claimed in claim 1, wherein said abutting and connecting step is performed before said severing step.

4. A method for producing an object lens holder for holding an object lens that converges a laser light radiated from a laser light source on a signal recording surface of an optical recording medium, comprising the steps of:

forming a first plurality of resilient deflecting portions in a first thin sheet member;

forming a second plurality of resilient deflecting portions in a second thin sheet member;

integrally molding a first bobbin half of synthetic resin on said first thin sheet member and around portions of said first plurality of deflecting portions;

integrally molding a second bobbin half of synthetic resin on said second thin sheet member and around portions of said second plurality of deflecting portions;

abutting and connecting said first and second bobbin halves to each other, and severing said first and second bobbin halves from said first and second thin sheet members together with said first and second pluralities of said resilient deflecting portions.

5. The method as claimed in claim 4 therein said first and second thin sheet members are each in the form of a thin strip and wherein said first and second pluralities of resilient deflecting portions are formed by punching said first and second thin sheet members.

6. The method as claimed in claim 4, wherein said abutting and connecting step is performed before said severing step.

* * * * *